United States Patent
Neve De Mevergnies et al.

(10) Patent No.: US 11,664,994 B2
(45) Date of Patent: May 30, 2023

(54) SECURE UNLOCK SYSTEMS FOR LOCKED DEVICES

(71) Applicant: Intel Corporation, Santa Clara, CA (US)

(72) Inventors: Michael Neve De Mevergnies, Beaverton, OR (US); Neel Shah, Billerica, MA (US); Kumar Dwarakanath, Folsom, CA (US); Fred Bolay, Folsom, CA (US); Mukesh Kataria, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/983,904

(22) Filed: Aug. 3, 2020

(65) Prior Publication Data

US 2020/0366487 A1      Nov. 19, 2020

Related U.S. Application Data

(62) Division of application No. 15/640,439, filed on Jun. 30, 2017, now abandoned.

(51) Int. Cl.
*H04L 9/32* (2006.01)
*G06F 21/33* (2013.01)
(Continued)

(52) U.S. Cl.
CPC .......... *H04L 9/3228* (2013.01); *G06F 21/335* (2013.01); *G06F 21/6218* (2013.01);
(Continued)

(58) Field of Classification Search
CPC ..... H04L 9/32; H04L 9/3228; G06F 21/6218; G06F 21/85; G06F 21/72; G06F 21/33;
(Continued)

(56) References Cited

U.S. PATENT DOCUMENTS 8,489,888 B2    7/2013  Lim
10,083,290 B2 * 9/2018  Von Bokern .......... H04L 63/107
(Continued)

OTHER PUBLICATIONS

Goryachy, Maxim and Mark Ermolov, "Intel DCI Secrets," The Sth Annual HITB Security Conference in the The Netherlands, Apr. 10-14, 2017, 22 pages, available at https://conference.hitb.org/hitbsecconf2017ams/materials/D2T4%20-%20Maxim%20Goryachy%20and%20Mark%20Ermalov%20-%20lntel%20DCI%20Secrets.pdf.

(Continued)

*Primary Examiner* — Khalid M Almaghayreh
(74) *Attorney, Agent, or Firm* — Nicholson De Vos Webster & Elliott LLP

(57) ABSTRACT

Technologies disclosed herein provide an apparatus comprising a fuse controller coupled to an aggregator. The fuse controller includes a plurality of fuses for storing a unique identifier of a device and a first secured value of a first password associated with the unique identifier. The aggregator is to receive the unique identifier and the first secured value from the fuse controller, send the unique identifier to an unlock host, receive a second password from the unlock host, compute a second secured value of the second password using a security function, and unlock one or more privileged features on the device based on the first secured value corresponding to the second secured value. In a specific embodiment, the first secured value corresponds to the second secured value if the first password is equivalent to the second password.

23 Claims, 20 Drawing Sheets

(51) Int. Cl.
*G06F 21/62* (2013.01)
*G06F 21/85* (2013.01)
*G06F 21/72* (2013.01)
*H04L 9/06* (2006.01)
*G06F 21/53* (2013.01)

(52) U.S. Cl.
CPC .............. *G06F 21/72* (2013.01); *G06F 21/85* (2013.01); *H04L 9/0643* (2013.01); *H04L 9/3213* (2013.01); *H04L 9/3226* (2013.01); *H04L 9/3247* (2013.01); *H04L 9/3297* (2013.01); *G06F 21/53* (2013.01); *G06F 2221/2149* (2013.01)

(58) Field of Classification Search
CPC . G06F 21/335; G06F 2221/2149; G06F 21/53
See application file for complete search history.

(56) References Cited

U.S. PATENT DOCUMENTS

| | | | | |
|---|---|---|---|---|
| 10,387,333 | B2* | 8/2019 | Chun | G06F 12/1425 |
| 10,558,589 | B1* | 2/2020 | de Cesare | G06F 21/78 |
| 10,873,466 | B2* | 12/2020 | Wu | H04L 9/3236 |
| 2007/0162759 | A1 | 7/2007 | Buskey et al. | |
| 2008/0159541 | A1* | 7/2008 | Kumar | G06F 21/57 |
| | | | | 380/278 |
| 2009/0204823 | A1 | 8/2009 | Giordano et al. | |
| 2009/0276844 | A1* | 11/2009 | Gehrmann | G06F 21/31 |
| | | | | 726/16 |
| 2010/0199077 | A1* | 8/2010 | Case | G06F 11/3656 |
| | | | | 713/1 |
| 2010/0332783 | A1* | 12/2010 | Youm | G06F 12/1491 |
| | | | | 713/193 |
| 2011/0067114 | A1 | 3/2011 | Weber et al. | |
| 2011/0119744 | A1 | 5/2011 | Cho et al. | |
| 2011/0125894 | A1 | 5/2011 | Anderson et al. | |
| 2011/0314541 | A1 | 12/2011 | Svensson et al. | |
| 2011/0316583 | A1* | 12/2011 | Henry | G01R 31/31719 |
| | | | | 326/38 |
| 2012/0047369 | A1* | 2/2012 | Henry | G06F 21/79 |
| | | | | 713/182 |
| 2012/0265998 | A1* | 10/2012 | Kumar | G06F 21/575 |
| | | | | 713/187 |
| 2013/0097657 | A1 | 4/2013 | Cardamore et al. | |
| 2013/0108063 | A1 | 5/2013 | Verhoeve et al. | |
| 2013/0346660 | A1 | 12/2013 | Kwidzinski et al. | |
| 2014/0044265 | A1 | 2/2014 | Kocher et al. | |
| 2014/0093074 | A1* | 4/2014 | Gotze | G06F 21/73 |
| | | | | 380/45 |
| 2014/0283119 | A1* | 9/2014 | Sandri | H04L 9/32 |
| | | | | 726/28 |
| 2015/0113278 | A1* | 4/2015 | Cocchi | H04L 63/0853 |
| | | | | 713/171 |
| 2015/0127983 | A1* | 5/2015 | Trobough | G06F 11/2733 |
| | | | | 714/30 |
| 2015/0188899 | A1* | 7/2015 | Bakar | H04L 63/0892 |
| | | | | 726/10 |
| 2015/0222604 | A1* | 8/2015 | Ylonen | H04L 9/3263 |
| | | | | 713/171 |
| 2015/0278548 | A1* | 10/2015 | Brands | H04L 63/08 |
| | | | | 726/9 |
| 2015/0331043 | A1 | 11/2015 | Sastry et al. | |
| 2016/0035148 | A1* | 2/2016 | Huang | H04L 9/0866 |
| | | | | 701/31.4 |
| 2016/0246985 | A1* | 8/2016 | Burkhardt | G06F 21/64 |
| 2017/0048711 | A1* | 2/2017 | Spaur | H04W 12/068 |
| 2017/0093866 | A1* | 3/2017 | Ben-Noon | H04L 67/12 |
| 2017/0142108 | A1* | 5/2017 | Zhang | H04L 63/0807 |
| 2017/0171200 | A1* | 6/2017 | Bao | H04L 9/3213 |
| 2017/0257369 | A1* | 9/2017 | Ito | G06F 21/76 |
| 2017/0289129 | A1* | 10/2017 | Ghetie | G06K 19/0723 |
| 2018/0134253 | A1* | 5/2018 | Zielinski | H04L 9/0618 |
| 2018/0189195 | A1* | 7/2018 | Chun | G06F 12/1425 |
| 2018/0278603 | A1* | 9/2018 | Yabe | H04L 63/08 |
| 2018/0302228 | A1* | 10/2018 | Hergesheimer | H04L 9/321 |
| 2018/0351748 | A1* | 12/2018 | Pai | H04L 9/14 |
| 2019/0007212 | A1 | 1/2019 | Mevergnies et al. | |
| 2019/0065733 | A1* | 2/2019 | Forehand | H04L 9/32 |
| 2020/0310972 | A1* | 10/2020 | Shanbhogue | G06F 12/1009 |

OTHER PUBLICATIONS

Ruan, Xiaoyu, "Platform Embedded Security Technology Revealed, Safeguarding the Future of Computing with Intel Embedded Security and Management Engine," Apress Media, LLC, 2014 (pp. 81-84) (8 pages).

USPTO Examiner's Answer to Appeal Brief in U.S. Appl. No. 14/279,007 dated Dec. 10, 2019 (12 Pages).

USPTO Final Office Action in U.S. Appl. No. 14/279,007 dated Aug. 27, 2018 (22 pages).

USPTO Final Office Action in U.S. Appl. No. 14/279,007 dated May 1, 2017 (18 pages).

USPTO Non-Final Office Action in U.S. Appl. No. 14/279,007 dated Aug. 1, 2016 (10 pages).

USPTO Non-Final Office Action in U.S. Appl. No. 14/279,007 dated Dec. 27, 2017 (17 pages).

USPTO Pre-Brief Conference Decision in U.S. Appl. No. 14/279,007 dated Apr. 2, 2019 (2 pages).

Edmondson, Robert, Gregory Iovino, and Richard Kacprowicz, "Optimizing the Cost of Test at Intel Using per Device Data," IEEE International Test Conference, 2006, Paper 1.1 (8 pages).

Mayberry, Mike, John Johnson, Navid Shahriari, and Mike Tripp, "Realizing the Benefits of Structural Test for Intel Microprocessors," IEEE ITC International Test Conference, 2002, Paper 16.3 (pp. 456-463) (8 pages).

* cited by examiner

US 11,664,994 B2

SECURE UNLOCK SYSTEMS FOR LOCKED DEVICES

CROSS-REFERENCE TO RELATED APPLICATIONS

This application is a divisional (and claims the benefit of and priority under 35 U.S.C. § 120 and § 121) of U.S. application Ser. No. 15/640,439, filed Jun. 30, 2017 and entitled SECURE UNLOCK SYSTEMS FOR LOCKED DEVICES. The disclosure of the prior application is considered part of and is incorporated by reference in the disclosure of this Application.

TECHNICAL FIELD

This disclosure relates in general to the field of computer system architecture features and, more particularly, to secure unlock systems for locked devices.

BACKGROUND

Protection of intellectual property and other proprietary information embodied in system on chips (SoCs) and other devices is required by the device manufacturers and original equipment manufacturers (OEMs) who make systems that incorporate those devices. Devices, such as an SoC, are typically locked during the manufacturing process to prevent unauthorized access to the device by third parties, such as an OEM, a sub-component vendor, or others who attempt to gain access to the intellectual property and other proprietary information embodied in the device. Certain third parties, however, may need at least some access to privileged features of a device to implement the device into a final product or provide additional functionality to the device during the device lifecycle, for example. Privileged features may include, but are not necessarily limited to, debugging, provisioning, testing, validation, prototyping, and/or analyzing features that enable access to certain proprietary code or information in the device. Effective techniques are needed to allow authorized users to unlock devices and access privileged features on the devices, while simultaneously protecting against devices being unlocked by unauthorized users.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EMBODIMENTS

Figure 1:
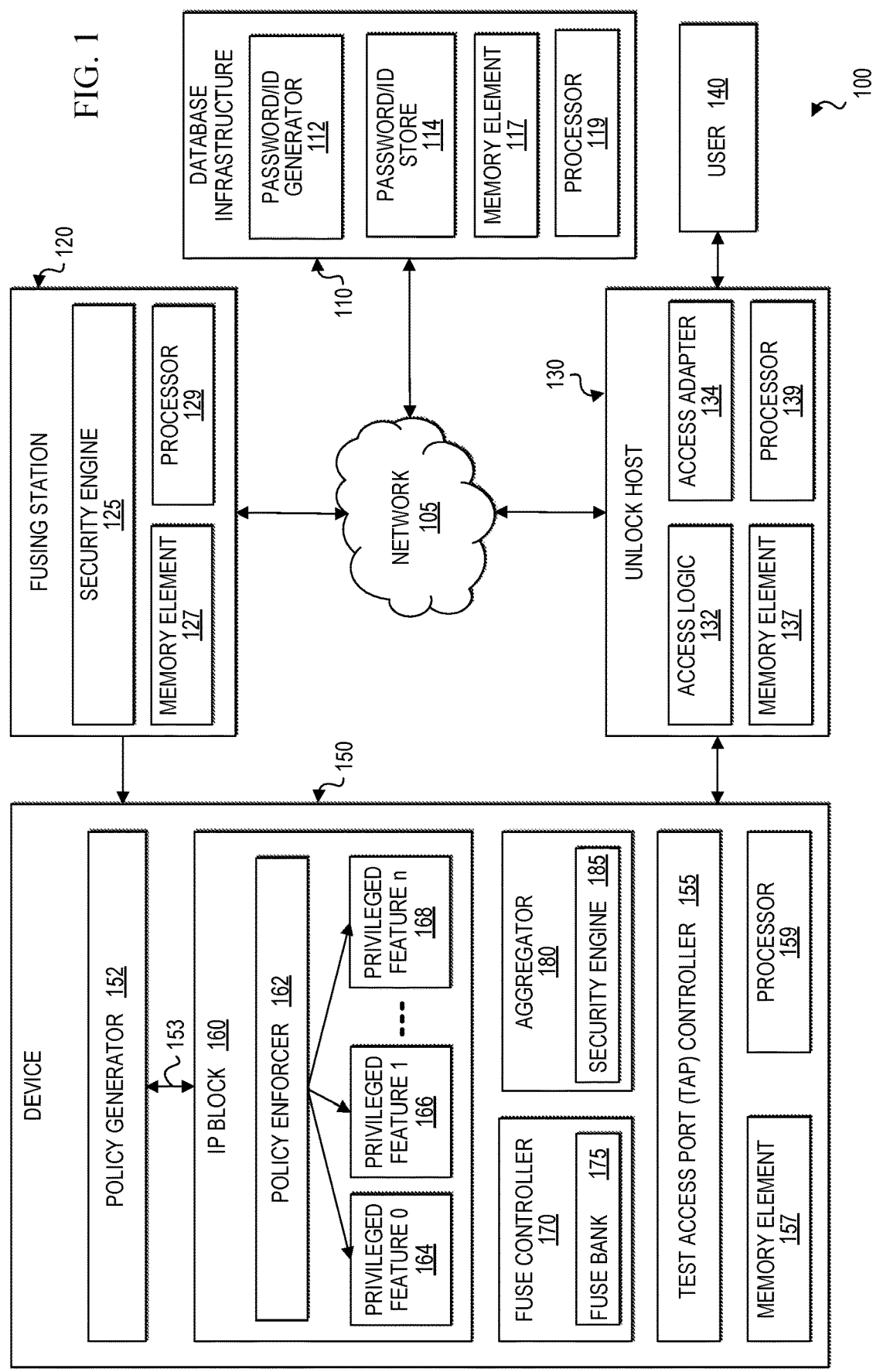
FIG. 1 is a simplified block diagram illustrating a first secure unlock system based on encrypted passwords according to at least one embodiment of the present disclosure.

The following disclosure provides various possible embodiments, or examples, for implementing a secure unlock system for locked devices. A device can be a system that includes multiple components. Examples of devices in which teachings of the present disclosure may apply include, but are not necessarily limited to, central processing units (CPUs), system on chips (SoCs), devices products, microprocessors, chips and microchips (e.g., Platform Controller Hub (PCH)), integrated circuits (ICs), graphical processing units (GPUs), and processing systems. A device may be locked to prevent unauthorized access to proprietary information and computing blocks on the device via privileged features. Privileged features can include, but are not limited to debugging, validating, provisioning, testing, prototyping, and analyzing performance features for accessing proprietary computing blocks (or "intellectual property (IP) blocks" or "blocks") and/or proprietary information on the device. Privileged features can also include particular output messages that provide proprietary information or data, and that are disabled during normal use of the device. Other privileged features can include code associated with security or authentication that can be disabled to allow unrestricted or less-restricted access to certain proprietary computing blocks and information.

For purposes of illustrating the several embodiments of a secure unlock system for locked devices, it is important to first understand the lifecycle and configuration of locked devices and the privileged features available on those devices. Accordingly, the following foundational information may be viewed as a basis from which the present disclosure may be properly explained.

A device, such as a system on a chip (SOC) and other processing systems, generally moves through various stages of a device lifecycle that may include fabrication, provisioning, testing, debugging, validation, etc. before transitioning to a final product. Even after entering the marketplace, devices can be tested and debugged, such as when devices are returned for debugging to their manufacturer or the customer that implemented the device in a final product. As a device moves through these stages, various assets are added to the device, either by the device manufacturer, a sub-component vendor, or the customer (e.g., the OEM for whom the device is made and who implements the device in their own products, etc.). Assets can include any type of proprietary information or data such as secrets, keys (e.g., enhanced privacy identification key, content protection keys, encryption keys), certificates, and other data to which access is generally restricted. Assets can further include other sensitive digital assets including executable code provisioned on a component or computing block within the device, among other examples.

A variety of entities can be involved in the development and lifecycle of a device. Assets, including sensitive data and intellectual property, of the respective entities can be provisioned on the device as it progresses through its lifecycle. For instance, assets can be provisioned as computing blocks added to the device, as secret and proprietary logic and code added to the computing blocks, among other examples. The owners or providers of these assets may desire, or require, that these assets remain private and/or protected from access by unauthorized users. However, certain types of accesses may risk exposing the assets to the user(s) performing the task, as the user inspects various components, data, registers, memory, and operations of the device and various computing blocks present and interoperating on the device.

Accordingly, it can be desirable in some instances to limit access to particular assets and components during certain types of use sessions (e.g., debugging, testing, validating, etc.) performed on the device. For instance, security logic can be provided to define and enforce modes at particular blocks of the device, such that assets associated with the particular blocks are protected from access by particular users during particular use sessions such as debugging or testing, for example. The level of access can be based on the identity of the session user, as some users may be authorized to access assets of the device while other users may not be authorized to access the assets. Indeed, in some cases unauthorized access to some assets (e.g., encryption keys, secrets, CPU firmware, power management algorithms, control over execution flow of some logic blocks, etc.) can compromise or threaten the value of the assets. Further, the level of debug access (and other types of access) can also vary based on the lifecycle stage of the device. For instance, the level of desired debug access (by each respective entity) to the device can vary as the lifecycle progresses and various assets are provisioned. For example, in the beginning, the device may comprise a bare system chassis with no secret or proprietary data or components and unfettered debug access can be provided at least to the verified users associated with the manufacturer of the device chassis. However, once secrets such as content keys are provisioned, access to these assets may be disallowed, even to the engineers manufacturing or debugging the device or its sub-components and other users who once previously enjoyed access to these components during a previous lifecycle stage.

While it may be desirable to limit access to particular assets and components as the device progresses through the lifecycle, certain entities may have a legitimate need to use various privileged features for limited, extended, or indefinite time periods. For example, an OEM may receive a locked device (e.g., SoC), which was made by the manufacturer for the OEM to implement in its own product (e.g., a smartphone). The OEM is likely to need at least some privileged features to effectively test and/or debug the device, among other examples, as it is transitioned into the final product. Without the ability to use privileged features during debug, testing, or validation sessions, for example, the OEM may only receive messages permitted by a mode that applies the highest level of protection to the IP blocks on the device. Consequently, timely and efficient completion of the final product could be negatively impacted.

Although OEMs generally need the ability to use at least some privileged features of devices they are implementing in their own products, OEMs may also desire and indeed, often require, protection of the IP blocks in the device. In some scenarios, password or key lists may be provided to a third party to unlock a device to allow the use of one or more privileged features on the device. Storing keys or passwords on a device and providing a list of the keys/passwords to an OEM, however, does not adequately protect the IP blocks and other proprietary information. Sharing such lists can weaken control and protection of the keys or passwords on those lists, as this unsecured information is at risk of inadvertent or intentional distribution to unauthorized individuals or entities.

Furthermore, unprotected passwords or keys stored within the device may be vulnerable to attacks, and thus, could potentially enable unauthorized access to proprietary assets on the device by a malicious entity. The threat of unauthorized access to privileged features of a device could undercut any competitive advantage sought by an OEM that uses the device in its product.

Secure Fuse Passwords to Unlock a Device

Turning to FIG. 1, a secure unlock system 100 resolves many of the aforementioned issues (and more). The simplified block diagram illustrates an example of secure unlock system 100, which includes a database infrastructure 110, a fusing station 120, a device 150, an unlock host 130, and a network 105. A user 140 interacts with unlock host 130 to be authenticated to unlock and use privileged features on device 150. Device 150 comprises a policy generator 152, one or more computing blocks such as IP block 160, a fuse controller 170 including a fuse bank 175 of multiple fuses, an aggregator 180 including a security engine 185, and a test access port (TAP) controller 155. Fusing station 120 includes a security engine 125, which can perform the same security function as security engine 185 of aggregator 180. Database infrastructure 110 can include a key generator 112 for generating unique identifiers ("unique IDs") and provisioning passwords for devices. Database infrastructure can also include a password/ID store 114 for storing unique IDs and passwords for unlocking devices, such as device 150. Unlock host 130 can include access logic 132 and an access adapter 134 for accessing device 150. Access logic 122 can also facilitate communication with database infrastructure 110 via network 105. Elements of FIG. 1 also contain appropriate hardware such as memory elements (e.g., 117, 127, 137, 157) and processors (e.g., 119, 129, 139, 159), which may be realized in numerous different embodiments, at least a few of which will be further described herein.

In secure unlock system 100, a per part secret is secured using a security function such as a cryptographic hash function that maintains pre-image resistance or other suitable function providing protection such as an encryption algorithm or other cryptographic or obfuscation function. A password and unique identifier for device 150 is obtained from the manufacturer's database, a security function is applied to the password by security engine 125 of fusing station 120 to obtain a secured value (e.g., hashed value, obfuscated value, encrypted value, etc.), and the secured value and unique identifier are stored in fuses of fuse bank 175 by fusing station 120. Unlock host 130 can be used to unlock the device by querying the device for its unique identifier in fuse bank 175, establishing a communication session via network 105 to database infrastructure 110, querying the database for the password associated with the unique identifier of the device, and providing the received password to the device for verification. Device 150 uses security engine 185 to apply the same security function (e.g., cryptographic hash function, encryption algorithm, obfuscation function, etc.) to the password received from unlock host 130. If the secured value derived from applying the security function to the received password corresponds to the secured value stored in the device fuse bank 175, then one or more privileged features can be unlocked based on the particular policies associated with the unique identifier and/or password. Otherwise, the privileged features remain locked, thus preventing access to the proprietary data and components in the device.

This solution provides several significant advantages. Because the secured value of the password is stored in the fuse bank of the device, there is no dependency on the confidentiality of the fuses to maintain a locked state of the device. The property of the security function removes the need for fuse-based secrets because it is nearly impossible to find the pre-image even if the digest and all of the details of the security algorithm are known. Therefore, even if an attacker could obtain the contents of the fuses, including the secured value of the password, the attacker would be unable to use them to unlock the device's privileged features, and therefore would be unable to access the proprietary data and components that could otherwise be accessed by the privileged features. Additionally, although secure unlock system 100 is shown with a single device, it should be appreciated that the system is scalable and capable of application to any number of devices and different types of devices. Furthermore, implementation of secure unlock system 100 would have limited impact on regular manufacturing lifecycles and no impact on the actual components of the devices.

With reference to FIG. 1, a brief description is now provided about some of the possible infrastructure that may be included in secure unlock system 100. Secure unlock system 100 may span multiple, possibly discrete, network environments. Generally, secure unlock system 100 can include any type or topology of networks, indicated by network 105. Network 105 represents a series of points or nodes of interconnected communication paths for receiving and sending network communications that propagate through secure unlock system 100. Network 105 offers a communicative interface between nodes, and may be configured as any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment, or any suitable combination thereof. Network 105 can use any suitable technologies for communication including wireless (e.g., 3G/4G/5G/nG network, WiFi, Institute of Electrical and Electronics Engineers (IEEE) Std 802.11™-2012, published Mar. 29, 2012, WiMax, IEEE Std 802.16™-2012, published Aug. 17, 2012, Radio-frequency Identification (RFID), Near Field Communication (NFC), Bluetooth™, etc.) and/or wired (e.g., Ethernet, etc.) communication. Generally, any suitable means of communication may be used such as electric, sound, light, infrared, and/or radio (e.g., WiFi, Bluetooth or NFC).

Database infrastructure 110 can be provisioned in any suitable network environment capable of network access (e.g., via network 105) to fusing station 120 and unlock host 130. For example, database infrastructure 110 could be provisioned in a manufacturer's network with access to a wide area network (e.g., Internet) to communicate with test houses (e.g., unlock host 130) of customers, such as OEMs that receive the manufacturer's devices (e.g., device 150) to be incorporated in their products. In another example, database infrastructure 110 could include a distributed database across multiple physical locations. The database infrastructure could potentially reside in a cloud network and be accessed via any suitable network or networks (e.g., Internet, VPN, etc.) by fusing station 120 and unlock host 130. The cloud network could be a private, public, or hybrid cloud computing infrastructure platform. Fusing station 120 may be provisioned in a network associated with a manufacturer of device 150, and unlock host 130 may be provisioned in a network associated with an entity that receives the manufactured device, such as a testing house of an OEM that incorporates the device in the production of its own product.

During the manufacturing process, device 150 can be connected to fusing station 120 to enable storage of data in the fuse bank 175 of the device. Once fabrication of the device is complete, device 150 can be physically provided to a customer, such as an OEM, and communicatively coupled to an unlock host (e.g., 130). In some scenarios, during manufacturing, device 150 may be provided to, or otherwise accessed by, sub-component vendors or other providers of computing blocks, data, software, and/or firmware to be included on the device. One way of accessing device 150 is the Joint Test Action Group (JTAG) standard, which is formally referred to as the Institute of Electrical and Electronics Engineers 1149.1-2001 Standard Test Access Port and Boundary-Scan Architecture, Jul. 23, 2001. Access adapter 134 of unlock host 130 can be a JTAG adapter, and can be connected to device 150 via any suitable interface including, but are not limited to, Ethernet, peripheral component interconnect (PCI), and universal serial bus (USB).

The JTAG standard defines a generic external test access port (TAP), which is represented by test access port (TAP) controller 155 in device 150. This TAP controller can provide an interface to aggregator 180 when unlock host 130 communicates with device 150, for example, when a user attempts to unlock the device using unlock host 130. JTAG can be used in secure unlock system 100 to obtain unique identifiers from the aggregator 180 and to provide data, such as a password, to the aggregator. Although JTAG is one example industry standard that could be used to exchange information (e.g., passwords and unique identifiers) between devices and an unlock host, other standards could be implemented as well.

Although FIG. 1 shows database infrastructure 110 in communication with a single fusing station 120 and a single unlock host 130, it should be appreciated that any number of fusing stations in one or more manufacturing facilities may be in communication with the database infrastructure as different devices progress through the manufacturing process. Similarly, any number of unlock hosts in one or multiple test houses may be in communication with database infrastructure 110 to unlock devices as needed during production and/or post-production (e.g., repairs, recalls, etc.). Also, a single device (e.g., 150) is shown to be communicatively coupled to fusing station 120 in FIG. 1. It should be noted that fusing station 120 could provision numerous devices with secured values during the manufacturing flow to enable unlocking the devices. Furthermore, although a single device (e.g., 150) is shown coupled to unlock host 130, it should be appreciated that unlock host 130 could be communicatively coupled to any number of other devices as they are debugged, tested, validated, prototyped, provisioned, analyzed, etc.

Database infrastructure 110 can be embodied in one or more network elements and storage elements. As used in this specification, 'network elements' are meant to encompass routers, switches, gateways, bridges, load balancers, firewalls, inline service nodes, proxies, servers, processors, processing systems, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information. As used herein, 'storage elements' are meant to encompass any type of non-volatile memory capable of storing data and information, and should be construed as encompassing any database management system (DBMS), relational database management system (RDBMS), repository, register, queue, table, cache, or other storage structure, all of which can be referenced at any suitable timeframe.

In at least one embodiment, database infrastructure 110 generates, stores, and responds to queries for unique identifiers and passwords of devices. Database infrastructure 110 generates a respective unique identifier ("unique ID") for each device being manufactured. The database infrastructure also generates one or more passwords for each device. The passwords can indicate a particular unlock mode in which a current use session is allowed to run. Different unlock modes specify different combinations of privileged features that can be unlocked to provide access to proprietary data and/or code in a device. For example, one password could be associated with a 'green mode,' in which a limited number of privileged features are unlocked. Another password could be associated with a 'yellow mode,' in which a greater number of privileged features are unlocked than the orange mode, but not all privileged features are unlocked. Another password could be associated with an 'orange mode,' in which unrestricted use of privileged features is enabled on the device. In at least one embodiment, devices are configured to permit the provisioning of a maximum of seven passwords to enable seven levels of access to the device based on various privileged features. It should be apparent, however, that devices could be configured to enable the provisioning of any number of passwords indicating various levels of access based on particular implementations and needs.

It should also be noted that a particular password or particular set of passwords assigned to a device may also be assigned to other devices of the same type. For example, a device having a certain specification and requirements may be ordered in bulk by a customer. Every device in the order may be provisioned with the same password or set of passwords in at least one example. In another example, a device associated with a particular project (internal or external) or manufacturing flow may be provisioned with the same password or set of passwords.

A password or set of passwords for a particular device can be stored in database infrastructure 110 and mapped to the unique ID of the device. Passwords and unique identifiers are stored in the database infrastructure for future consumption by fusing stations (e.g., fusing station 120) and unlock hosts (e.g., unlock host 130). In some scenarios, for example, when a device includes a set of passwords and a user attempts to access the device via an unlock host, database infrastructure may also maintain a mapping of user credentials to passwords for the device in order to differentiate which device passwords are to be provided to the unlock host for which users authenticated at the unlock host.

Fusing station 120 is part of the manufacturing flow for devices, such as device 150. In at least one embodiment, fusing station 120 can be provisioned in a high-volume manufacturing (HVM) process. During the manufacturing process of device 150, fusing station 120 is communicatively coupled to database infrastructure 110 to receive passwords and unique identifiers of the device. Fusing station 120 is also operably connected to the device during manufacturing to burn data into the device, for example, into fuses of fuse bank 175. Security engine 125 of fusing station 120 may be configured to perform a security function on a password to produce a secured value that is not feasible to invert to the original password. This secured value, along with the un-altered unique identifier for the device, can be burned into the device (e.g., into fuses of fuse bank 175). If multiple passwords are associated with the unique identifier, then the security function can be applied to each password to generate multiple secured values, and each secured value can be burned into the device.

In one example, the security engine performs a cryptographic hash function on a password to produce a digest (i.e., a hash value resulting from applying a hash function to a string of data). The hash function is a mathematical algorithm that maps data of any size to a bit string of a fixed size, which is referred to herein as a "hash value." The hash function is designed to be a one-way function in which it is not feasible to invert the hash value to the original data. Although several one-way hash functions are available, they often comprise complex logic with blocks having many gates. Chips with a high gate count have a higher likelihood of random defects that prevent the device from being unlocked. Thus, a hash function with a reduced gate count may be desirable in at least some embodiments.

Secure Hash Algorithms (SHA) is a family of cryptographic hash functions published by the National Institute of Standards and Technology (NIST) as a U.S. Federal Information Processing Standard (FIPS). SHA-2 and SHA-3 are examples of hash functions that may be used as security engine 125 in fusing station 120. It should be appreciated, however, that the particular hash function employed by embodiments described herein may vary and alternative hash functions having greater or smaller blocks of logic than SHA-2 or SHA-3, including other hash functions within the SHA family, may be used according to particular implementations and needs. Encryptions, protection and obfuscation techniques can be used as well.

Possible embodiments of device 150 can include, but are not necessarily limited to, a processing system, a central processing unit (CPU), system on chip (SoC), devices product, microprocessor, chip and microchip (e.g., Platform Controller Hub (PCH)), integrated circuit (IC), and/or graphical processing units (GPU). One or more computing blocks (e.g., IP block 160) are provisioned in device 150, one or more of which contain proprietary data and/or code. For ease of illustration, a single IP block is shown in FIG. 1. However, devices typically contain multiple computing blocks. These computing blocks can be interconnected through one or more links and interconnect architecture. For instance, a general purpose or specialized interconnect architecture can be used to facilitate communication and memory operations between the computing blocks. One or more interconnect protocols, such as Peripheral Component Interconnect (PCI), Peripheral Component Interconnect (PCI) Express (PCIe), Quick Path Interconnect (QPI), High Performance Interconnect (HPI) (e.g., a serial point-to-point differential protocol with embedded clock), and Advanced Microcontroller Bus Architecture (AMBA) AXI architectures, Quick Path Interconnect (QPI), Mobile Industry Processor Interface (MIPI) M-PHY (e.g., multimedia and chip-to-chip/interprocessor communications), etc. can be employed on the interconnect. In some examples, a device chassis is provided by a first entity and one or more of the computing blocks (e.g., 160) are provided by one or more other entities (although the same entity can provide both the chassis and some or all of the component computing blocks in other examples).

In the example of FIG. 1, policy generator 152 is a computing block provided to manage debug and testing policies for all (or some set of) computing blocks of device 150. Other policies including, but not limited to, validating, provisioning, prototyping, and/or analyzing, may also be managed by policy generator 152. A set of blocks (e.g., 160) can be configured to operate with policy generator 152 and can include policy enforcer logic 162 to enforce block-specific responses to various debug/testing/etc. policies. For instance, sideband links 153 can be used to facilitate communication between the respective policy enforcer logic 162 and the policy generator 152. In some cases, sideband links can be dedicated sideband links and can ensure secure trusted communication between the policy enforcers, such as policy enforcer 162, and the central policy generator 152.

In some implementations, policy generator 152 can be configured with hardware, firmware, and/or software logic to authenticate and determine an unlock mode associated with the password used to unlock the device, the identity of a particular user seeking access to device 150, and the lifecycle stage of the device. A user may be attempting any number of privileged activities on the device including, but not necessarily limited to debugging, testing, validating, provisioning, prototyping, and/or analyzing performance. Various policies can be defined based on the unlock mode of the password used to unlock the device, the user's identity, the lifecycle of the device, or any combination thereof. The level of debug access (and other privileged feature access) to be applied at each respective block (e.g., 160 and any others not shown) can be based on the policy and can be block-specific. The respective policy enforcer logic (e.g., 162) can dictate how the corresponding block's debug access (and other privileged feature access) is affected by the policy. In some implementations, the policy generator 152 is provided in connection with a defined device chassis framework, with each component, or block, configured for the framework. In some examples, compatibility with the framework can dictate the inclusion of policy enforcer logic (e.g., 162) on each component within device 150, such that debug access (and other privileged feature access) of every block on the device is managed with the assistance of a central policy generator (e.g., 152) provided in accordance with the defined framework, among other example implementations.

In at least one embodiment, policy generator 152 can compute an access policy to be applied to device 150 based on an unlock mode associated with the password used to unlock the device, lifecycle information, and/or a particular user identity or user classification. Lifecycle information can be received by policy generator 152 and a lifecycle stage of the device can be determined. Further, user authentication information can be received by policy generator 152 from unlock host 130 via TAP controller 155 to map the user to a particular identity or user classification. In other embodiments, the user authentication information can be used by database infrastructure 110 to determine which password associated with the unique identifier is to be returned to unlock system 130 to attempt to unlock the device. The password used to unlock the device can be used by policy generator 152 to determine an unlock mode in which the current use session is allowed to run. In other embodiments, the unlock mode can be received by policy generator 152 from unlock host 130 or some other storage element. The policy generator 152 can compute access policies based on the unlock mode. For example, policy generator 152 can compute an access policy to be applied to device 150 based, at least in part, on the privileged features specified by the unlock mode to be enabled or disabled (e.g., enable debug access for a particular component, enable privileged output messages, disable security or authentication code, etc.). In other implementations, the device or some other storage element to which the device is coupled could contain a mapping of the unlock mode to specific privileged features to be unlocked on the device.

The computed access policy can then be broadcast (e.g., over secure sideband channels 153) to all IP block endpoints (e.g., 160) to alert the respective policy enforcers (e.g., 162) of the policy to be applied for a duration of activities (e.g., debugging, testing, validating, provisioning, prototyping, analyzing performance, etc.) during a use session by the particular user corresponding to the user authentication from unlock host 130. Each policy enforcer (e.g., 162) can decode the policy signal received from policy generator 152 to identify the policy and determine what activities and/or access to allow at the corresponding IP block (e.g., 160) during the use session. In some cases, a policy enforcer can define a plurality of unlock modes for its corresponding IP block, such that various activities at the IP block are allowed or denied depending on the unlock mode applied at the IP block. Such activities can include, access to protected assets, access to scan modes within the IP block (e.g., that allow the user to shift out the data and gain access to the protected asset), among other examples. For instance, the policy enforcer can manage the unlock mode of the IP block to control access and activity at the block. The policy enforcer can cause the corresponding IP block to enter a particular one of its defined modes based on the policy that is broadcast for device 150 during a given use session for debugging, testing, validating, provisioning, prototyping, analyzing performance, etc.

Any given computing block (e.g., IP block 160) may support any number of features or capabilities that might be leveraged or used during a particular use session (e.g., for debugging, testing, etc.). For instance, such features (or "privileged features") of the IP block (e.g., 160) can include multiple potential features (e.g., 164, 166, 168) that might be enabled or disabled during the use session by policy enforcer 162 based upon the particular policy or unlock mode determined by policy generator 152 and applied during the use session. For instance, when some debug policies are declared for a device, one or more of debug features 0-n (e.g., 164, 166, 168) may be disabled, for instance, to protect access to various sensitive assets. In some implementations, policy enforcer 162 can maintain and consult a mapping of defined debug policies (i.e., defined for the device) and debug features (e.g., 164, 166, 168). For instance, policy enforcer 162 can receive a policy signal broadcast to IP blocks (e.g., 160) using a secure bus of the device, decode the signal to identify a debug policy to apply during a corresponding debug session, and determine which debug features (e.g., 164, 166 168) of the block to enable or disable to enforce the particular debug policy based on a consultation of policy-to-debug feature mapping.

In this example of device 150, fuse controller 170 includes fuse bank 175, which comprises multiple fuses for storing a unique identifier of the device and for storing secured values generated by fusing station 120 for one or more passwords associated with the device. Fuse controller 170 can include non-volatile memory including, but not necessarily limited to programmable read-only memory (PROM), field programmable read-only memory (FPROM), or one-time non-volatile memory (OTP NVM). Fuse bank 175 includes multiple fuses in which each bit is locked by a fuse and cannot be changed. Data, such as a unique identifier of device 150 or a secured value of a password associated with the unique identifier, can be stored using multiple fuses in fuse bank 175. The data is burned into fuse bank 175 by fusing station 120 and, in at least some scenarios, is performed after other manufacturing processes for the device have been successfully completed. The fuse controller 170 is also communicatively coupled to aggregator 180 and sends the unique identifier and secured values stored in its fuse bank 175 to aggregator 180 whenever device 150 boots (e.g., runs a boot process to initialize hardware of the device and load an operating system in the device).

In this example, aggregator 180 is an IP block of device 150 and is provided with logic that determines whether to grant an unlock request for the device. In one example, aggregator 180 functions as a gate to the device. The unique identifier of the device and its associated secured values, which are stored in fuse bank 175, are downloaded to aggregator 180 when the device boots. Aggregator 180 caches or otherwise temporarily stores the unique ID and secured values until a password is received from unlock host 130. Upon receiving a password from unlock host 130, security engine 185 of aggregator 180 applies a security function to the password received from the unlock host to produce a secured value. Security engine 185 is configured to perform the same security function that is performed by security engine 125 of fusing station 120. If one of the secured values from fuse controller 170 corresponds to the secured value computed by the aggregator, then aggregator 180 grants the unlock request and unlocks one or more privileged features of the device. Accordingly, policy generator 152 can receive an indication from aggregator 180 to unlock the device. In one example, the indication can include the password (or secured value of the password) used to unlock the device, an unlock mode associated with the password, user authentication information, and/or life-cycle data. Policy generator 152 can manage access to particular features based on a determined policy or unlock mode, as previously described herein. In at least one embodiment, policy generator 152 may also be incorporated in aggregator 180 in at least one implementation.

In the example of FIG. 1, unlock host 130 is a computing system that can be configured with hardware, firmware, and/or software logic to enable authentication of a user attempting to unlock privileged features of a device (e.g., 150). As used in this specification 'computing systems' are intended to encompass servers, appliances, personal computers, laptops, mobile devices, processors, modules, processing systems, or any other suitable device, component, element, proprietary appliance, or object operable to exchange information in a network environment. Unlock host 130 is provided with access adapter 134 for communicating with a device (e.g., 150), and access logic 132 that enables authenticating credentials of a user that is attempting to access the device. The credentials of a user can indicate an access level of the device to which that user is permitted, if the unlock request is granted by aggregator 180. Users can include, but are not limited to, authorized users of the device manufacturer, authorized users of a customer that receives the device (e.g., OEM), or authorized users of a sub-component vendor. These entities may each run an unlock host (e.g., 130) at their facilities and use the unlock host to unlock privileged features of the device.

A user can attempt to unlock a device (e.g., 150) when the device is communicatively coupled to the unlock host, for example, via JTAG access adapter 134 of the unlock host 130 and TAP controller 155 of device 150. Unlock host 130 is provided with access logic 132 to communicate with the device (e.g., 150) and a database infrastructure (e.g., 110), to which access may be provided by the manufacturer (e.g., in a manufacturer's cloud or other accessible network). Once a user is authenticated, unlock host 130 can read out the unique identifier of the device from the aggregator (e.g., 180) of the device. Unlock host 130 can establish a network connection to the database infrastructure, such as database infrastructure 110, and query the database infrastructure based on the unique identifier for a corresponding per part password. The database infrastructure can identify a password (i.e., unaltered) corresponding to the unique identifier and can send the password back to the unlock host. In at least one embodiment, the authentication information associated with credentials of the user, which were provided to unlock host 130, can be provided to the database infrastructure along with the unique identifier. In this embodiment, the database infrastructure can then determine, based on the authentication information, which password corresponds to the unique identifier.

The database infrastructure (e.g., 110) can send the identified password to unlock host 130, and unlock host 130 can transmit the identified password to the device (e.g., 150) using a TAP command. Data, such as the identified password, can be transmitted to the device via access adapter 134 and TAP controller 155.

Figure 2:
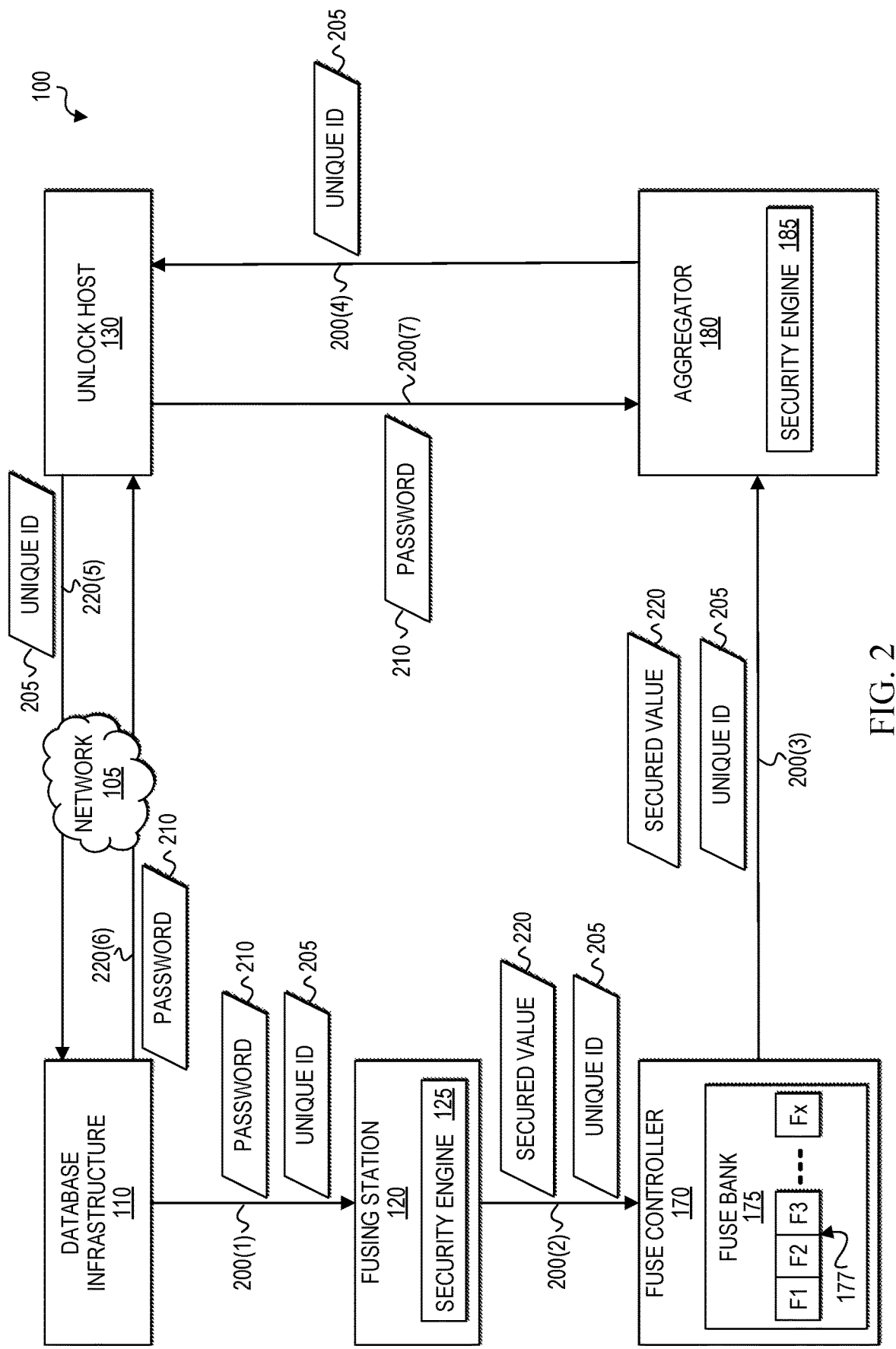
FIG. 2 is a simplified interaction diagram of a first secure unlock system according to at least one embodiment of the present disclosure.

Turning to FIG. 2, FIG. 2 is a simplified interaction diagram of secure unlock system 100, according to at least one embodiment. FIG. 2 illustrates potential communications between components in the system including database infrastructure 110, fusing station 120, fuse controller 170 of device 150, aggregator 180 of device 150, and unlock host 130. In at least one embodiment, one or more sets of operations correspond to the activities and interactions of FIG. 2. Each of the components of secure unlock system 100, or a portion thereof, may utilize at least one set of operations. Each of the components may comprise means including, for example, processors 119, 129, 139, 159, for performing such operations. The interactions of FIG. 2 follow device 150 through at least a portion of a manufacturing flow. FIG. 2 illustrates interactions that may occur when users of the manufacturer attempt to unlock the device or when the device is provided to another entity (e.g., OEM, sub-component vendor, etc.) and a user associated with the other entity attempts to access the device.

Initially, database infrastructure 110 can generate a unique identifier ("unique ID") 205 for device 150, along with one or more random passwords, such as password 210, based on how many levels of access are to be made possible for a use session. The unique ID and one or more random passwords are stored by database infrastructure 110 for future consumption by fusing station 120 and unlock host 130. Although multiple access levels with corresponding multiple random passwords may be provisioned in device 150, for ease of illustration, a single password (e.g., 210) is shown in FIG. 2.

At 200(1), unique ID 205 for device 150 and the corresponding password 210 are provided to fusing station 120 by database infrastructure 110. Fusing station 120 receives unique ID 205 and password 210. Security engine 125 applies a security function to password 210 to generate secured value 220. At 200(2), fusing station can burn unique ID 205 and secured value 220 into the fuse bank 175 of device 150. Multiple fuses 177 (e.g., F1, F2, F3, . . . Fx) may be used to store a single data item, such as unique ID 205 or secured value 220. In at least one embodiment, the same number of fuses may be used to store the secured value as a corresponding unaltered password.

When device 150 boots up, at 200(3), fuse controller 170 downloads unique ID 205 and secured value 220 from fuses 177 to aggregator 180. Aggregator 180 can temporarily store the data while waiting for a communication from unlock host 130. A user may initiate unlock host 130 and provide credentials to the unlock host for authentication. If the user is authenticated by unlock host 130, then at 200(4), unlock host 130 can read the unique ID 205 from aggregator 180.

At 200(5), unlock host 130 can query database infrastructure 110 for a password corresponding to the unique ID. Database infrastructure 110 can search its stored data for a match using unique ID 205. If unique ID 205 is found, then one or more corresponding passwords can be identified. If multiple passwords correspond to unique ID 205, then database infrastructure 110 can determine which password enables an authorized unlock mode for the user. In at least one embodiment, this determination can be made based on authentication information associated with one or more credentials of the user (e.g., credentials used to authenticate to unlock host 130).

At 220(6), database infrastructure 110 sends the identified password 210 back to unlock host 130. It should be apparent that if a malicious user attempted to guess a valid unique ID to send to database infrastructure 110, then a different password (or no password if the guessed unique ID was not a valid ID for any part) would be sent back to unlock host 130 from database infrastructure 110. Unlock host 130 may use a TAP command to communicate, at 200(7), the identified password 210 to aggregator 180.

Upon receiving password 210, aggregator 180 uses security engine 185 to apply a security function to the password to produce a new secured value. This new secured value produced by the aggregator is compared to secured value 220 from fuses 177 to determine whether there is a correspondence. In at least one embodiment, where security engines 125 and 185 apply the same security function, there is a correspondence if the secured values match. If a correspondence is confirmed, then the unlock request is granted by aggregator 180. In other embodiments, homomorphic encryption techniques may be used to gain additional properties. In such embodiments, a correspondence between the secured values may be based, at least in part, on the additional properties rather than a full match of secured values, such as hash values.

Figure 4:
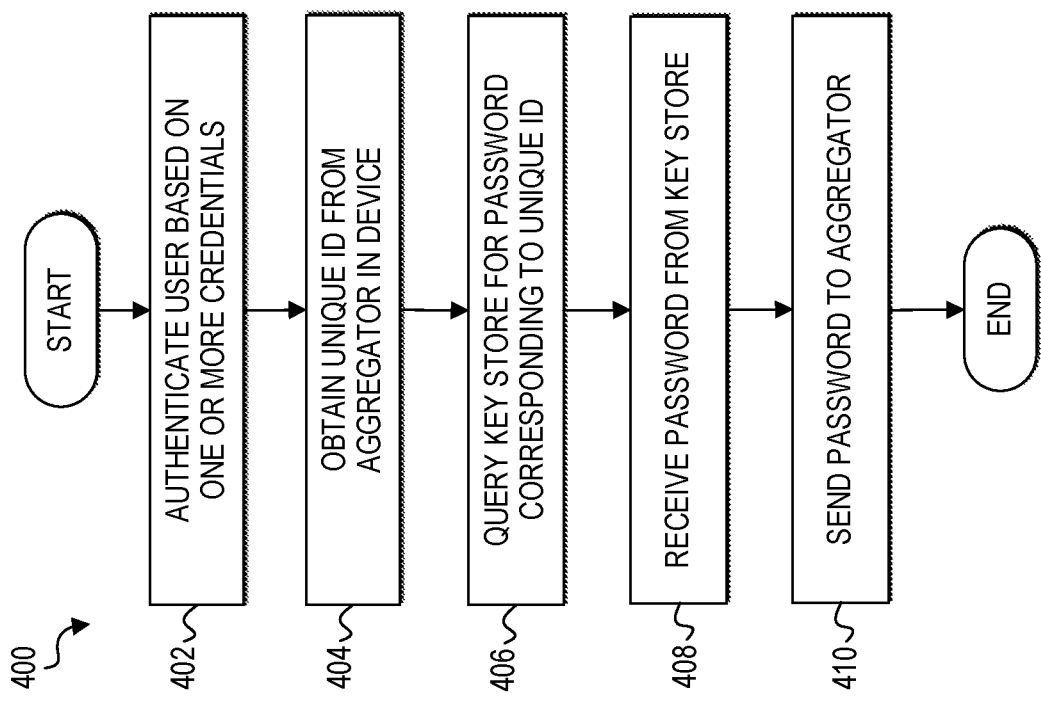
FIG. 4 is a simplified flow chart illustrating further example operations that may be associated with at least one embodiment of the present disclosure.
Figure 3:
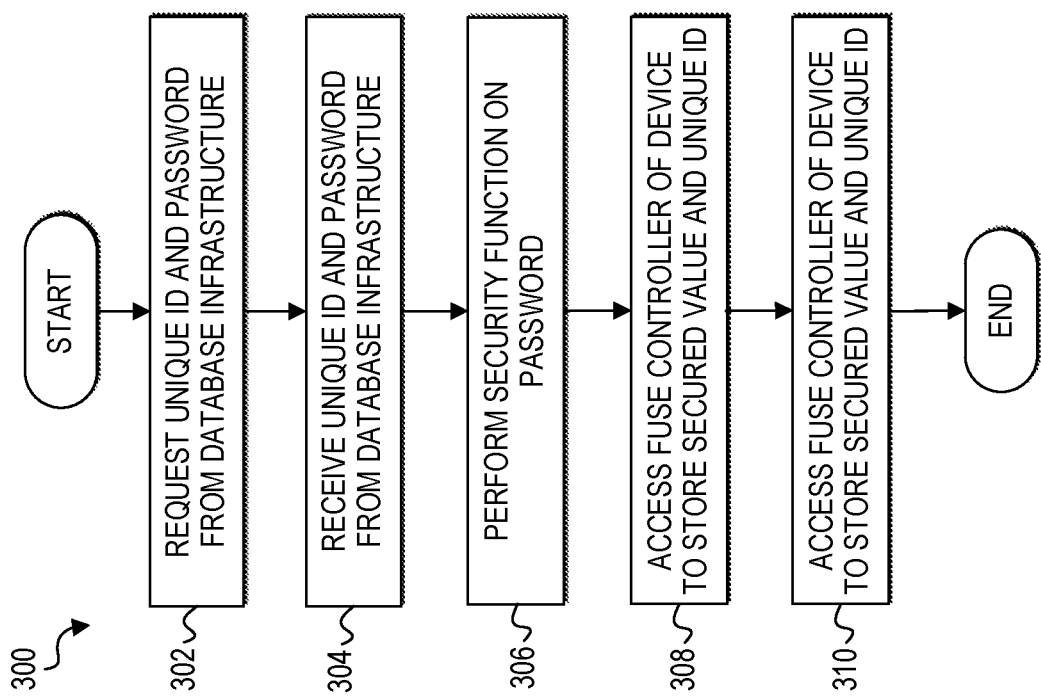
FIG. 3 is a simplified flow chart illustrating example operations that may be associated with at least one embodiment of the present disclosure.
Figure 5:
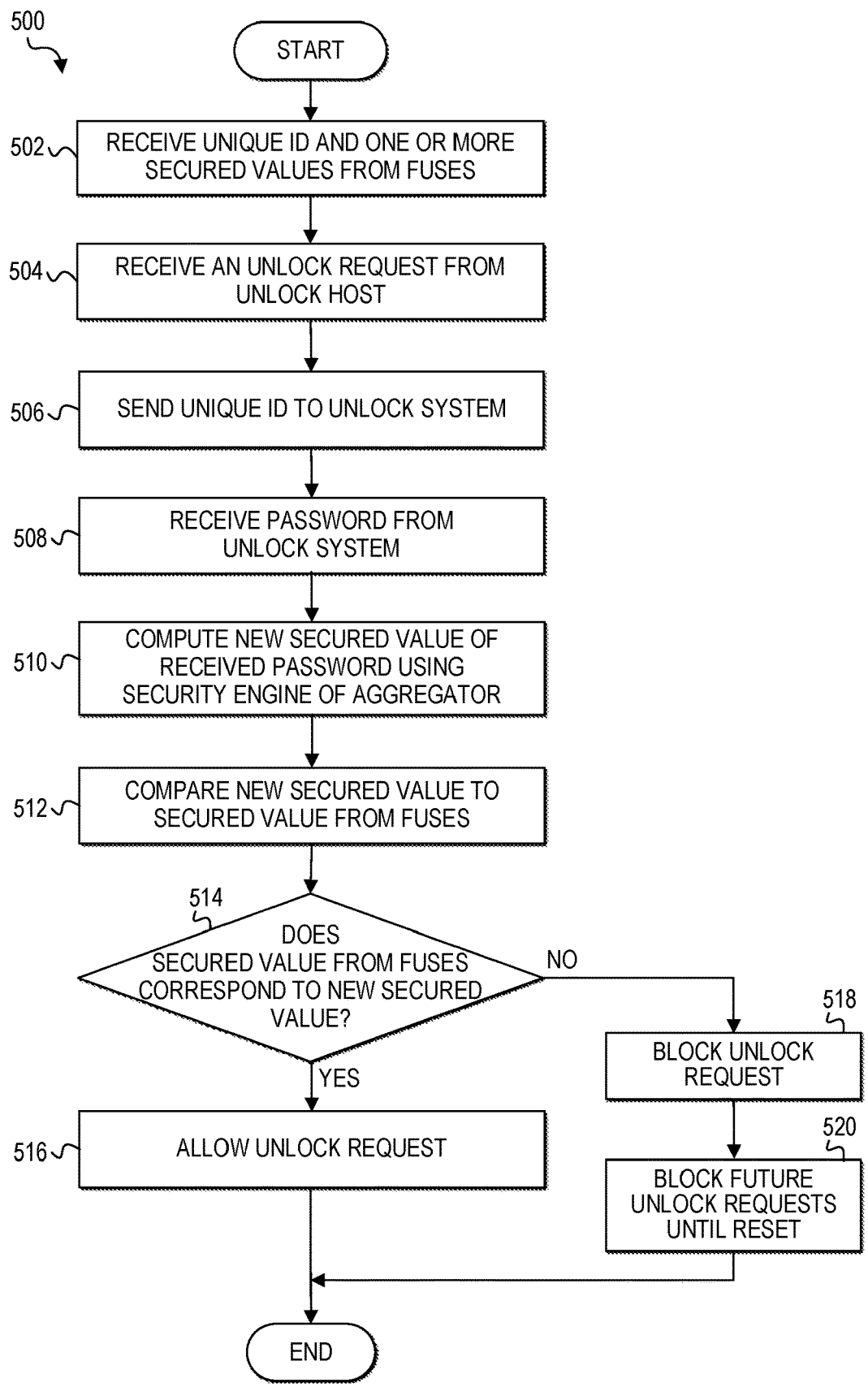
FIG. 5 is a simplified flow chart illustrating yet further example operations that may be associated with at least one embodiment of the present disclosure.

FIGS. 3-5 are simplified flowcharts of possible operations that may be associated with an embodiment of secure unlock system 100. FIG. 3 is an example flowchart illustrating a possible flow 300 of operations that may be associated with embodiments described herein. In at least one embodiment, a set of operations corresponds to activities of FIG. 3. Fusing station 120, or a portion thereof, may utilize the set of operations. Fusing station 120 may comprise means such as processor 129, for performing the operations.

At 302, fusing station 120 sends a request to database infrastructure 110 for a unique ID and one or more passwords for a device. At 304, fusing station 120 receives the unique ID and password from database infrastructure 110. At 306, security engine 125 performs a security function on the password to produce a secured value. At 308, the fusing station accesses the fuse controller of the device to store the secured value and unique ID into fuses 177. If the fusing station receives multiple passwords for the device, the security function is applied to each password, and each resulting secured value is stored in fuses 177 of the device. At 310, a message is sent to database infrastructure 110 confirming that the unique ID and secured value of the password were successfully stored in the fuses of the device. A message that confirms the fusing happened successfully can cause the database infrastructure to store the unique ID and password combination. If fusing is not successful, then the part may be destroyed. Therefore, if the message is not received by database infrastructure 110, or if an error message is sent to the database infrastructure indicating the fusing was unsuccessful, then the database infrastructure does not keep a record of the unique ID/password combination.

FIG. 4 is an example flowchart illustrating a possible flow 400 of operations that may be associated with embodiments described herein. In at least one embodiment, a set of operations corresponds to activities of FIG. 4. Unlock host 130, or a portion thereof, may utilize the set of operations. Unlock host 130 may comprise means such as processor 139, for performing the operations. In an embodiment, one or more operations of flow 400 may be performed by access logic 132.

Flow 400 begins at 402, where the unlock host authenticates a user based on one or more credentials. At 404, the unlock host obtains a unique ID from the aggregator in the device. At 406, the unlock host queries the password/ID store 114 of database infrastructure 110 for a password corresponding to the unique ID. At 408, the unlock host receives the password and at 410, forwards the password to the aggregator using a TAP command in one example.

FIG. 5 is an example flowchart illustrating a possible flow 500 of operations that may be associated with embodiments described herein. In at least one embodiment, a set of operations corresponds to activities of FIG. 5. Aggregator 180 of device 150, or a portion thereof, may utilize the set of operations. Device 150 may comprise means such as processor 159, for performing the operations. In an embodiment, one or more operations of flow 500 may be performed by aggregator 180 and security engine 185.

At 502, the aggregator receives a unique ID of the device and one or more secured values of one or more passwords associated with the unique ID. In one example, downloading the secured values and unique ID to the aggregator may be part of a boot process of the device. Generally, a boot process initializes hardware of the device and loads an operating system into memory. The aggregator can cache or otherwise temporarily store the secured values and then idle or wait until it is invoked. A user may attempt to unlock the device via unlock host 130. In at least one embodiment, unlock host 130 does not attempt to unlock device 150 unless one or more credentials of the user are successfully authenticated, for example, by an access permission system. An access permission system may be managed by the entity in possession of the device (e.g., manufacturer, OEM, etc.). When a user authenticates to unlock host 130, at 504, the aggregator receives a request from the unlock host to unlock the device. In at least one embodiment, unlock system 130 performs TAP commands to read out the unique ID from aggregator 180. At 506, in response to receiving the request to unlock the device, aggregator 180 sends the unique ID, which was cached or otherwise temporarily stored by the aggregator during the boot process of the device, to the unlock host.

At 508, the aggregator receives a password from the unlock host. If there are no errors and the correct unique ID (e.g., 205) for the device was used to query database infrastructure 110, then a password associated with the device is received by aggregator 180. Otherwise, a different password may be received by the aggregator at 508. At 510, aggregator 180 uses security engine 185 to apply a security function to the received password to create a new secured value. As previously described herein, in at least one embodiment, the same security function can be applied by the security engines in aggregator 180 and fusing station 120.

At 512, the new secured value is compared to the secured value received from the fuses of the device. At 514, a determination is made as to whether the secured value from the fuses corresponds to the new secured value. If multiple secured values were downloaded, then the cached secured values are searched to determine whether any one of them corresponds to the new secured value. A correspondence can be determined to exist if the new secured value matches, or otherwise corresponds to (e.g., when homomorphic encryption techniques are used), the secured value from the fuses. If there is a correspondence, then at 516, the unlock request is allowed. Unlocking the request can be accomplished by providing an indication to a policy generator (e.g., 152) of the device that the device is to be unlocked. The indication can include the password (or secured value of the password) used to unlock the device, authentication information associated with the user, and/or lifecycle information of the device, to be used to determine what level of access or unlock mode is permitted. In some scenarios, the aggregator determines the unlock mode that is to be applied and provides the unlock mode to the policy generator and the fuse controller. If at 514, no correspondence is determined to exist between the new secured value and the secured value from the fuses, then at 518, the unlock request can be blocked. Future unlock requests are also blocked, as indicated at 520, until the device is reset.

Signed Token to Unlock a Device

Figure 6:
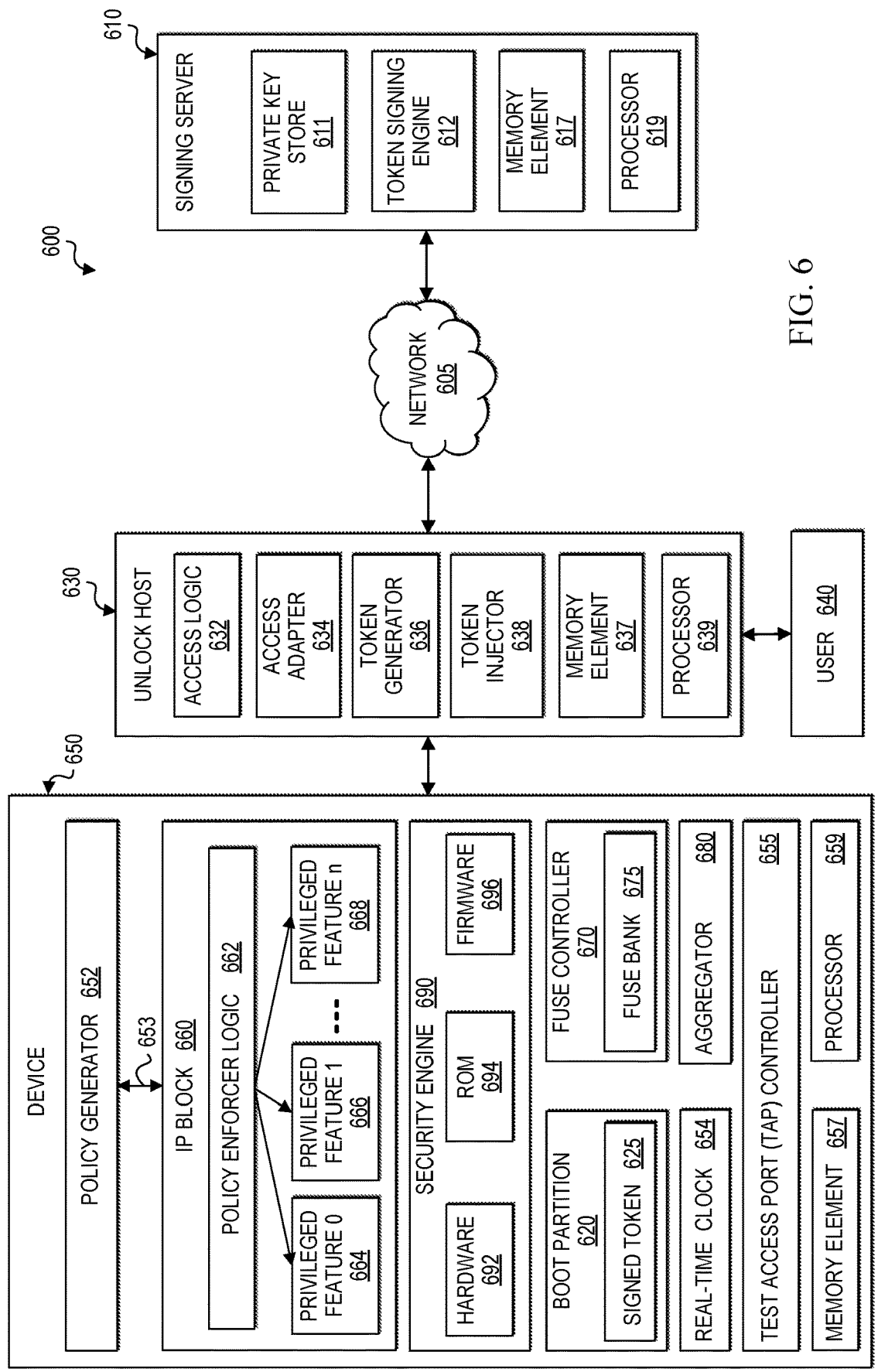
FIG. 6 is a simplified block diagram illustrating a second secure unlock system based on signed tokens according to at least one embodiment of the present disclosure.

Turning to FIG. 6, a secure unlock system 600 is another embodiment that for enabling authorized users to unlock privileged features in the device. The simplified block diagram illustrates an example of secure unlock system 600, which includes a signing server 610, an unlock host 630, a device 650, and a network 605. Device 650 can be a system that includes multiple components. A user 640 interacts with unlock host 630 to generate a token specifying particular privileged features on device 650 to be unlocked. Once a signed token is injected into device 650, user 640 can be authenticated to unlock and use privileged features on device 650. These privileged features may be related to debugging, testing, validating, provisioning, prototyping, analyzing, etc. features for accessing proprietary computing blocks and/or proprietary information on the device. Privileged features can also include certain output messages containing or indicating proprietary information and code associated with security or authentication.

In secure unlock system 600, an authorized entity (e.g., manufacturer, customer) can control the right to use privileged features on a device (e.g., 650), where the control is independent of the manufacturer or any other entity. This control is managed using signing server 610 to sign the token generated for the device by the unlock host, injecting the signed token into the device, and verifying the signed token when the device boots for a use session. Unlock host 630 can generate a token based on information from the device and communicate with signing server 610 to request the token to be signed. Signing server 610 hosts a private key for signing tokens. The signed token can then be injected into the device, for example, by unlock host 630. An authorized user can use unlock host 630 to unlock one or more privileged features (e.g., debugging, testing, validation, prototyping, analyzing performance, etc.) of the device. When the user initiates a use session and is authenticated by unlock host 630, an embedded security engine (e.g., 690) in the device verifies the authenticity and integrity of the signed token. Additionally, the security engine determines whether the token is applicable to the device being accessed and optionally, whether the token has expired. If all of the checks pass, then the device is unlocked by the security engine in a particular unlock mode, based on unlock data in the token. Privileged features specified by the unlock data in the token can be used during the session. Thus, the authorized entity can obtain additional information from the device useful for their development, debug, or validation, among other examples.

Secure unlock system 600 provides several advantages for unlocking privileged features on a device. For authorized entities of a device, such as OEMs, sub-component vendors, etc., the signed token solution of secure unlock system 600 eliminates the need for the manufacturer of the device to be involved in the unlocking process. Instead, the authorized entity can control who can unlock the device, how much access is given to those authorized users who can unlock the device, and how the signing server is implemented and managed, among other examples. The verification of the token is performed without the need of an external server under the control of the manufacturer. During the manufacturing flow of an OEM, where connection to external networks and servers may be unavailable, if access is needed to the device, for example to debug or test the device, a token can be used to unlock the device without dependency on a successful connection to an external server. Also, as the token scheme is a cryptographically secure method for enabling privileged features instead of obscure methods, only if the user consents to a certain use session (e.g., debug, test, etc.) by providing the device for the use session can the privileged features in the device be used. Thus, the user's privacy is protected.

Secure unlock system 600 also enables an authorized entity to choose which privileged features can be unlocked and which privileged features remain locked or otherwise restricted. For example, an OEM may be working with a third-party vendor for development of features on their platform. The OEM can provide tokens to the third-party vendor only for the devices that the OEM has provided to the third-party vendor. This ensures that third-party vendors cannot release tokens to unauthorized entities or individuals that work for all platforms owned by the OEM.

Another advantageous aspect of secure unlock system 600 involves expiry detection for a token, multiple device unlocking based on a token, granular control of privileged features, and protection against replay attacks. Expiry properties can be configured (e.g., by a manufacturer, an OEM, etc.) to enable administrators to control how long a token is to remain valid for a specific target device. Also, a user can generate one token for multiple devices, thus easing the deployment troubles for system validation setup, for example. Additionally, administrators can provide granular control on which privileged features in a device can be unlocked per user, per device. For example, an OEM can enable a third-party vendor to conduct debugging of an OEM system that the third-party vendor is using for development, but can restrict the kinds of messages the vendor can see when the vendor unlocks the device. Finally, replay attacks can be prevented due to an ephemeral nonce incorporated in the token that makes a valid token ephemeral based on the OEM policy. Thus, recording the token during the unlock would not benefit a malicious user.

With reference to FIG. 6, a description is now provided about some of the possible infrastructure that may be included in an embodiment of secure unlock system 600. Device 650 can include a policy generator 652, one or more computing blocks such as IP block 660, a fuse controller 670 including a fuse bank 675 with multiple fuses, an aggregator 680, a real-time clock 654, a test access port (TAP) controller 655, and a security engine 690. Computing blocks, such as IP block 660, can each include a policy enforcer (e.g., 662) and multiple privileged features (e.g., 664, 666, 668), as previously described herein. Security engine 690 can include hardware (HW) 692, read only memory (ROM) 694, and firmware (FW) 696 for verifying a token and determining if the token is applicable to the device. In the example of FIG. 6, unlock host 630 includes access logic 632 for authenticating a user (e.g., 640) and performing use sessions that can include debugging, testing, validating, provisioning, prototyping, analyzing, etc. Unlock host 630 also includes an access adapter 634 for communicating with devices (e.g., 650). Unlock host 630 further includes a token generator 636 and a token injector 638 for generating a token for unlocking privileged features of a device (e.g., 650) and injecting the token, or causing the token to be injected into, the device. Signing server 610 includes a private key store 611 and a token signing engine 612 to secure tokens by signing the tokens with a private key from the private key store. Elements of FIG. 6 also contain appropriate hardware such as memory elements (e.g., 617, 637, 657) and processors (e.g., 619, 639, 659), which may be realized in numerous different embodiments, at least a few of which will be further described herein.

Secure unlock system 600 may span multiple, possibly discrete network environments. Generally, secure unlock system 600 can include any type or topology of networks, at least partially indicated by network 605. Possible examples of network 605 are described herein at least with reference to network 105 of FIG. 1.

Signing server 610 can be provisioned in any suitable network environment(s) capable of network access (e.g., via network 605) to unlock host 630. In at least one embodiment, signing server 610 and unlock host 630 may be provisioned, managed, used, and/or otherwise under control of an authorized entity that uses unlock host 630 to access device 650. For example, a manufacturer could use an unlock host (e.g., 630) to unlock device 650 during or after the manufacturing flow for the device. An OEM could use its own unlock host to unlock device 650 once the OEM has received the device to be implemented in its own product. These entities may use their own signing server to sign tokens to manage access to devices when those devices are under their control, such as for manufacturing or production. Signing server 610 may be provisioned in a local area network with unlock host 630, in a remote network that unlock host 630 can access, or in a cloud network, among other examples. In another example, a third-party vendor of the manufacturer or an OEM, may not be given the authorization or ability to provision its own tokens. Instead, devices injected with a signed token, or devices with a separate firmware image including the signed token, may be provided to the vendor to unlock privileged features specified in the token. The token may also specify an expiration parameter that specifies the amount of time during which the token is to remain valid.

Unlock host 630 can be communicatively coupled to device 650 when the entity accessing the unlock host has physical possession of the device. For example, during the manufacturing process, an unlock host of the manufacturer may be coupled to device 650. Once the device is delivered to an OEM, an unlock host of the OEM may be coupled to device 650. If device 650 is provided to a sub-component vendor for additional functionality, an unlock host of the sub-component vendor may be coupled to the device. One common way of accessing device 650 is the Joint Test Action Group (JTAG) standard, which was previously described herein with reference to device 150 and unlock host 130 in FIG. 1. Access adapter 634 of unlock host 630 can be a JTAG adapter, and can be connected to device 650 via any suitable interface including, but not limited to, Ethernet, peripheral component interconnect (PCI), and universal serial bus (USB).

The JTAG standard defines a generic external test access port (TAP), which is represented by test access port (TAP) controller 655 in device 650. This TAP controller can provide an interface to aggregator 680 when unlock host 630 communicates with device 650, such as when a user generates and provisions a token or attempts to unlock the device after the token is injected into the device. JTAG can be used in unlock host 630 to request and receive a device identifier from the device, and to inject the token back into the device after the token has been signed. JTAG may also be used by access logic 632 to enable use sessions for the device that include debugging, testing, validating, provisioning, prototyping, and analyzing. Although JTAG is one example industry standard that could be used to obtain the needed information from the device (e.g., device identifier, nonce, timestamp, etc.), other standards could be implemented as well.

Although FIG. 6 shows signing server 610 in communication with a single unlock host 630, it should be appreciated that any number of unlock hosts provisioned, managed, used, and/or otherwise controlled by the same authorized entity may be capable of communicating with signing server 610 to unlock devices as needed during production and/or post-production (e.g., repairs, recalls, etc.) of devices. Furthermore, although a single device is shown coupled to unlock host 630, it should be appreciated that unlock host 630 could be communicatively coupled to any number of other devices as they are debugged, tested, validated, provisioned, prototyped, analyzed, etc.

Signing server 610 can be embodied in one or more network elements and possibly one or more storage elements, which have been previously described herein this specification. Signing server 610 can be configured with hardware, firmware, and/or software logic to perform operations described herein related to receiving tokens from an unlock host (e.g., 630), using private keys to sign the tokens, and sending the signed tokens back to the unlock host. Signing server 610 can include private key store 611, which contains private keys that are used to sign tokens generated by unlock host 630 and provided to the signing server to be signed. The private key store may be provided in signing server 610, as shown, or may be communicatively coupled to signing server 610 via some network.

Signing server 610 is configured with token signing engine 612, which includes an algorithm used to sign a token provided by unlock host 630. In at least one embodiment, token signing engine 612 may use a digital signing process involving an asymmetric key pair that includes a private key and an associated public key. In this example, the token signing engine applies a one-way hash function to at least some of the contents of the token to produce a hash value. Then, a cryptographic algorithm uses the private key of the key pair to sign (or encrypt) the hash value to create a signature. The signature can then be inserted into the token header of the token. In one implementation, token signing engine 612 also inserts the public key of the key pair into the token header. In such an implementation, the signature created by the private key can be reverted (or decrypted) to the data that was signed (e.g., the hash value) by using the public key of the key pair. In another implementation, the private key could be a symmetric key, in which the signature created by the private key can be inverted (or decrypted) to the pre-signed data by using the same private key.

In the example of FIG. 6, unlock host 630 is a processing system that can be configured with hardware, firmware, and/or software logic to enable generating and provisioning tokens for devices with privileged features. A user can attempt to access a device (e.g., 650) when the device is communicatively coupled to the unlock host, for example, via JTAG access adapter 634 of the unlock host and TAP controller 655 of the device. Unlock host 630 is provided with access logic 132, token generator 636, and token injector 636 to communicate with the device (e.g., 650) and signing server 610. Once a user is authenticated, unlock host 630 can receive, from the device, a device identifier and other information, such as a nonce and a timestamp, among other examples. At least some of this information comes from the aggregator (e.g., 680) of the device. Token generator 636 can generate a token based, at least in part, on the device ID and other information. After the token is signed by signing server 610, token injector 638 injects the signed token into a boot partition (e.g., 620) of the device, as indicated by signed token 625.

In at least one implementation, unlock host 630 can also enable authentication of a user (e.g., 640) attempting to access a device (e.g., 650) for a use session that may invoke one or more privileged features, if unlocked. Unlock host 630 is provided with access adapter 634 for communicating with a device (e.g., 650), and access logic 632 for authenticating credentials of a user. Users can include, but are not limited to, authorized users of the device manufacturer, authorized users of a customer that receives the device (e.g., OEM), or authorized users of a sub-component vendor. Manufacturers and customers such as OEMs may each run an unlock host (e.g., 630) at their facilities to generate and provision signed tokens for devices. When verified, the signed tokens enable authorized users to conduct various use sessions in which one or more privileged features on the device are unlocked. Such privileged features could include, for example, debugging, testing, validating, provisioning, prototyping, or analyzing features for accessing proprietary computing blocks and/or proprietary information in the device. Sub-component vendors or other third-party vendors may run an unlock host (or similar system), but without the authority to generate and provision tokens. For example, a manufacturer or OEM may generate and provision tokens in a group of devices to be provided to a vendor, where the tokens specify particular privileged features that may be unlocked during a debug (or other) use session on any of the devices.

Possible embodiments of device 650 can include, but are not necessarily limited to, a processing system, a central processing unit (CPU), system on chip (SoC), devices product, microprocessor, chip and microchip (e.g., Platform Controller Hub (PCH)), integrated circuit (IC), and/or graphical processing units (GPU). One or more computing blocks (e.g., IP block 160) are provisioned in device 650, one or more of which contain proprietary data and/or code. For ease of illustration, a single IP block is shown in FIG. 1. However, devices typically contain multiple IP blocks. In device 600, the configuration of IP blocks, such as IP block 660, and policy generator 652 may be similar to IP block 150 and policy generator 152, respectively, which were previously described herein with reference to FIG. 1. In at least one embodiment of secure unlock system 600, however, policy generator 652 can compute access policies based on the unlock mode, which may be specified in the token. For example, the token may specify which privileged features to unlock (e.g., by enabling or disabling depending on the feature). The policy generator 652 can compute access policies based on the privileged features specified in the token.

In this example of device 650, fuse controller 670 includes fuse bank 675, which comprises multiple fuses for storing a device identifier of the device and, in at least some implementations, for storing a secured value (e.g., hashed or other secured value) of the public key of the key pair used to sign and verify tokens. Fuse controller 670 can include non-volatile memory including, but not necessarily limited to programmable read-only memory (PROM), field programmable read-only memory (FPROM), or one-time non-volatile memory (OTP NVM). Fuse bank 675 includes multiple fuses in which each bit is locked by a fuse and cannot be changed. Data, such as a device identifier of device 650 or a hashed public key of a key pair, can be stored using multiple fuses in fuse bank 675. The fuse controller is also communicatively coupled to aggregator 680 and sends the device identifier and hashed public key stored in its fuse bank 675 to aggregator 680 whenever device 650 boots.

Aggregator 680 of device 650 is an IP block and is provided with logic that enables access to the device. In one example, aggregator 680 functions as a gate to the device. The device identifier and hashed public key, which are stored in fuse bank 675, are downloaded to aggregator 680 when the device boots. Aggregator 680 caches or otherwise temporarily stores the device ID and hashed public key and provides the data to security engine 690 when requested. When a token has been verified by security engine 690, it can send a request to aggregator to unlock the device based on the verified token. Aggregator 690 can use unlock data provided in the token to unlock privileged features on the device (e.g., via policy generator 652). Aggregator 690 can also unlock the fuse controller based on the unlock mode indicated by the verified token.

Boot partition 620 may be configured in device 650 to enable the device to boot when power is applied to it. Boot partition 620 can be a primary partition that contains a boot loader to load the operating system. In at least one embodiment, boot partition 620 can be injected with a signed token 625 by unlock host 630, which can be used to determine whether to unlock the device.

In the example shown in FIG. 6, embedded security engine 690 can be configured with hardware, firmware, and/or software logic to enable authentication and verification of a token. In at least one embodiment, security engine hardware 692, ROM 694, and firmware 696 provide information needed to generate a token and verify a signed token obtained from the boot partition (or a firmware file used to boot the device) when device 650 boots under a use session of an authorized user. During a process to generate a token for a device, security engine FW 696 gets a device ID and a timestamp, and generates a nonce when requested by unlock host 630. Real-time clock 654 of device 650 can be used to generate the timestamp. Security engine FW 696 provides this information to unlock host 630 to enable the unlock host to generate a token. Security engine FW 696 can also store a signed token in the boot partition of the device. During a process to unlock the device, security engine HW 692, security engine ROM 694, and security engine FW 696 coordinate to verify the signed token, and scrub the hardware to hide secrets that are not to be accessible even with the token.

It should be noted that numerous variations and configurations of device 650, unlock host 630, and signing server 610 are possible. In particular, the operations and functions described with reference to security engine FW 696 could be implemented in entirely in hardware, entirely in software, entirely in firmware, or any suitable combination thereof. Furthermore, in at least one embodiment, security engine 690 can be implemented based on virtualization technologies. Generally, as long as the security engine's root of trust is provided by hardware, the verification technique used to verify the token cannot be attacked and, therefore, may be implemented in any suitable configuration (e.g., hardware, software, firmware, virtualization, etc., and any combinations thereof).

Figure 7:
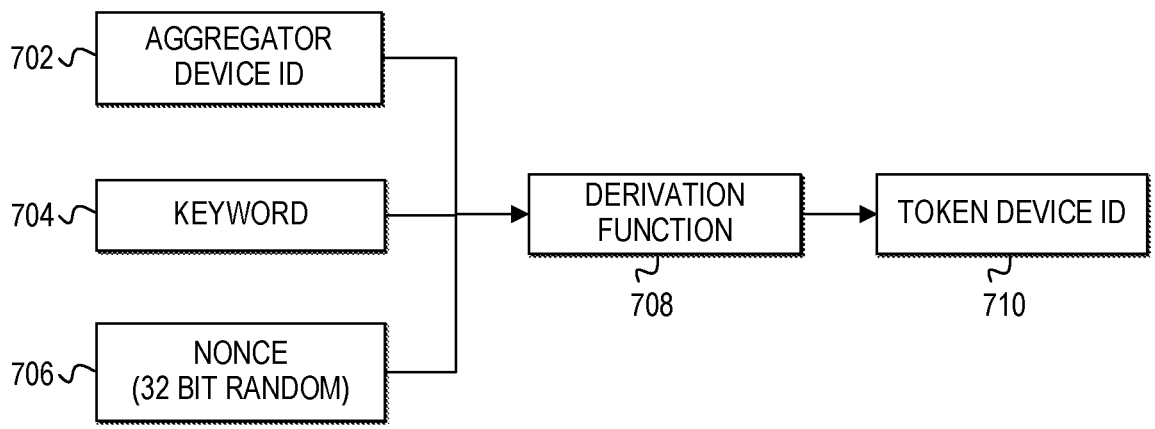
FIG. 7 is a simplified block diagram illustrating example parameters for creating a token device identifier according to at least one embodiment of the present disclosure.
Figure 8:
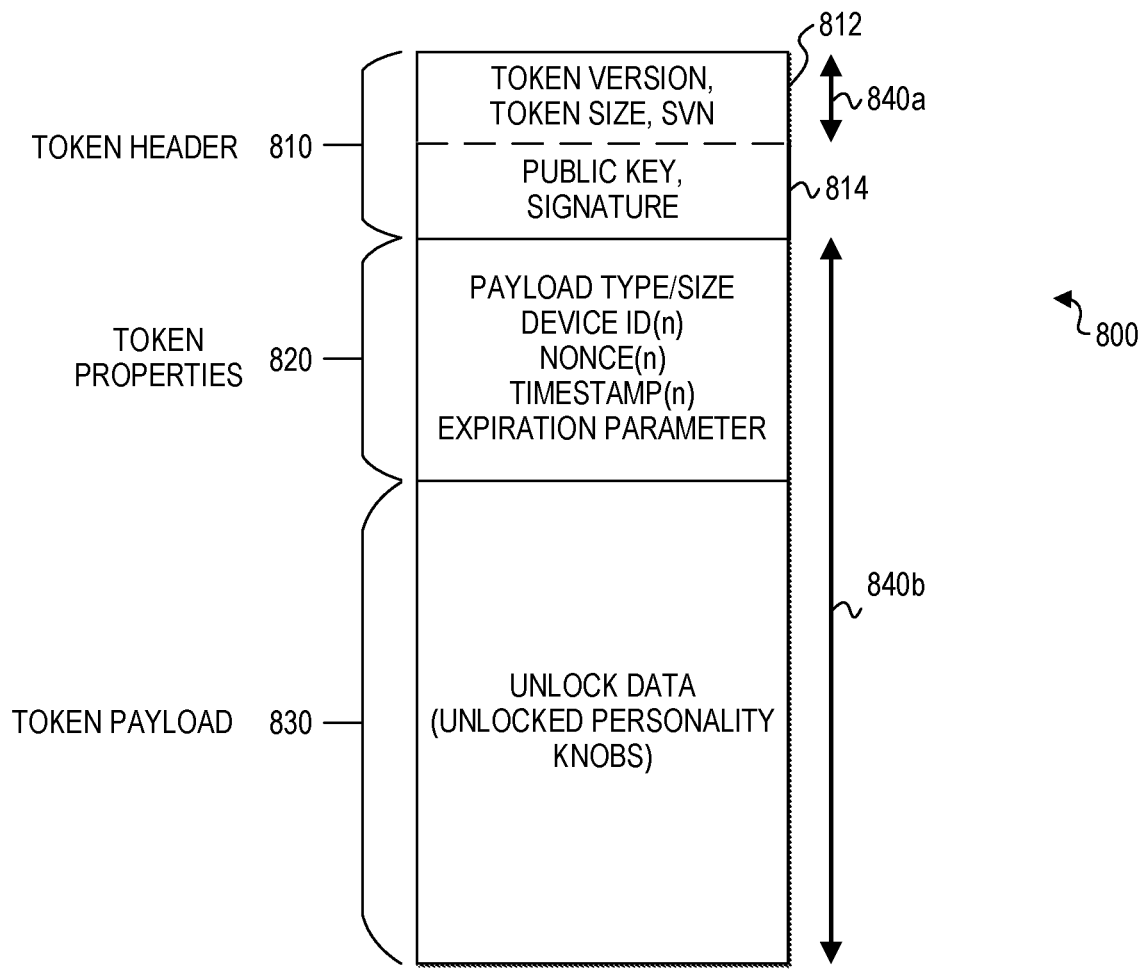
FIG. 8 is a simplified block diagram illustrating an example structure of a token according to at least one embodiment of the present disclosure.

In FIGS. 7-8, additional possible details related to a token used in secure unlock system 600 are illustrated. FIG. 7 illustrates how a token device identifier (ID) can be created. In at least one embodiment, a token device ID 710 is derived from a unique value stored on a device (e.g., 650) and two other parameters 704 and 706. The unique value is unique per device and may be an aggregator device identifier (ID) 702. Keyword 704 is a parameter that is different for each project and is a constant value in a device. For example, a keyword for one project could be ABC v1.0 and a keyword for another project could be XYZ v1.0. A nonce 706 is a value generated randomly at every device ID request by the embedded security engine firmware. The value can be generated using a hardware based random number generator in the device. In an embodiment, the nonce can be 32 bits. The nonce can be used to make the token "fresh" such that a replay of previous token is not possible if the nonce has been erased on the device. In some embodiments, the token device ID may be created without the keyword.

A derivation function 708 can be applied to the combination of aggregator device ID 702, keyword 704, and nonce 706, to generate token device ID 710. The derivation function can be any suitable function (e.g., hash function, encryption algorithm, other cryptographic or obfuscation function, etc.) to create a combined secured value representing the unique value and parameters. For ease of description, the derivation function used to create the token device ID may be further referenced herein as a "hash function" and the token device ID may be further referenced herein as a "hashed value." In one example, aggregator device ID 702 is a 64-bit unique value relative to other device IDs of other devices, and nonce 706 is a 32-bit value. The resulting token device ID may be truncated to 96 bits. Although particular values and bit sizes are disclosed, numerous other possible values, combinations of values, bit sizes of values and/or combinations of the values, and methods of generating or otherwise obtaining those values could be implemented to achieve the objectives of one or more embodiments describe herein based on particular needs and implementations.

FIG. 8 illustrates an example structure 800 of a token that may be used in one or more embodiments described herein. The example token structure 800 includes three sections: a token header 810, token properties 820, and a token payload 830. In this example, token header 810 includes a first segment 812 with a token version, size, and security version number (SVN), and a second segment 814 with a signature of the token and a public key that is the asymmetric pair to a private key used by (and possibly stored in) signing server 610. The signature of the token can be generated by signing server 610 using data in token properties 820, token payload 830, and/or first segment 812 of token header 810, as indicated by 840a and 840b. In one example, a private key stored or accessed by signing server 610 can be used to sign the data indicated by 840a and 840b in token 800. In at least one embodiment, signing the data may include, but is not limited to, applying a one-way hash function to certain data in the token (e.g., 840a and 840b) to produce a hash value, and encrypting or otherwise generating a signature based on the hash value.

Token properties 820 contains information related to the token and to the particular device that was used to create the token. Information related to the token can include, for example, the token payload type, token payload size, and an expiration parameter (e.g., expiration seconds, minutes, hours, etc.). Information related to the particular device that was used to create the token can include, for example, device ID, a nonce, and a timestamp. In one embodiment, the device ID stored in the token can be the token device ID, which is the hashed value of the aggregator device ID, the nonce, and the keyword obtained from the device. In other embodiments, the device ID can be the aggregator device ID stored in the fuses of the device. In yet other embodiments, both the token device ID and the aggregator device ID could be included in the token properties.

In some scenarios, a single token may be generated to unlock multiple devices. For example, if an OEM sends a group of the same type of devices to a third-party vendor to obtain some additional functionality, the OEM may generate a token to unlock all of the devices in that group. To enable a token to unlock multiple devices, token properties 820 can contain a list of device IDs of devices that can be unlocked by the token, along with the nonces and timestamps associated with each device ID. In some scenarios, token properties 820 may also contain flags that indicate whether the token can be used without device ID (aggregator device ID or token device ID) checking, among other examples.

It should be noted that the contents of token 800 shown in FIG. 8 provide one possible implementation, and that variations of the contents and the ways in which token verification is performed are not limited by the broad scope of this disclosure. For example, token properties 820 may include aggregator device IDs, the token device IDs, or both. Furthermore, a token device ID may be computed using other combinations of information with the aggregator device ID. For example, either the nonce or the keyword, but not both, may be combined with aggregator device ID in one variation. In these alternatives, the process for verifying the token may be altered according to the type of contents of token properties 820. The examples provided herein are for illustrative purposes and numerous other variations and configurations of the token may be implemented within the scope of the present disclosure.

Token payload 830 contains unlock data used for granular control of privileged features of computing blocks on the device. Unlock data can include configuration information to be used by the device (e.g., by policy generator 652) to configure access policies to be applied to the device. Granular control of privileged features can include, for example, enabling debugging, testing, validating, provisioning, prototyping, or analyzing features in a computing block, permitting or enabling messages to be output, disabling code associated with security and/or authentication processes, etc. In at least one embodiment, unlock data can specify a privileged feature (also referred to herein as 'personality knob') and indicate how the privileged feature is unlocked. Specific examples of granular control that can be configured based on unlock data provided in token payload 830 include, but are not limited to, enable debug of sensor hub, enable debug of audio, enable debug of image processing unit, enable debug of low power sub-systems, disable secure boot, disable FW authentication, enable CPU debug, enable messages to be output, etc. Generating the unlock data in the payload can be controlled by a token generation tool, such as token generator 636 provided in unlock host 630.

The payload section of the token payload can be used by a manufacturer or OEM to customize tokens when a 'one size fits all' token cannot be used. For example, if an OEM is engaging a third-party vendor for feature development on the platform, then the OEM can specify in the token payload which privileged features can be unlocked by the vendor and/or which messages output by the device are permitted to be viewed by the vendor. Different vendors may be given different types of access to the same group of devices and/or to different groups of devices. Unlock data to enable this customized unlocking is stored in token payload 830. In one example, the OEM can inject the token into each device (e.g., in boot partition) that the third-party vendor is to further develop or enhance. The OEM could also give the token to the third-party vendor to enable the vendor to stitch together a firmware image for the boot partition if the boot partition needs to be updated after changes or updates to the device are made by the vendor. In another scenario, the token may not be injected into each boot partition by the OEM. Instead, once the token is generated, the OEM may generate a firmware image with the token and a firmware image without the token and provide both firmware images to the third-party vendor. For a particular use session, the third-party vendor can boot a device with the appropriate firmware image (with or without the token) depending on whether privileged features will be needed during the particular use session. Thus, unlocking privileged features, including output messages, can be tailored to features and messages needed by the third-party vendor to efficiently complete their work on the devices, for example.

Figure 9:
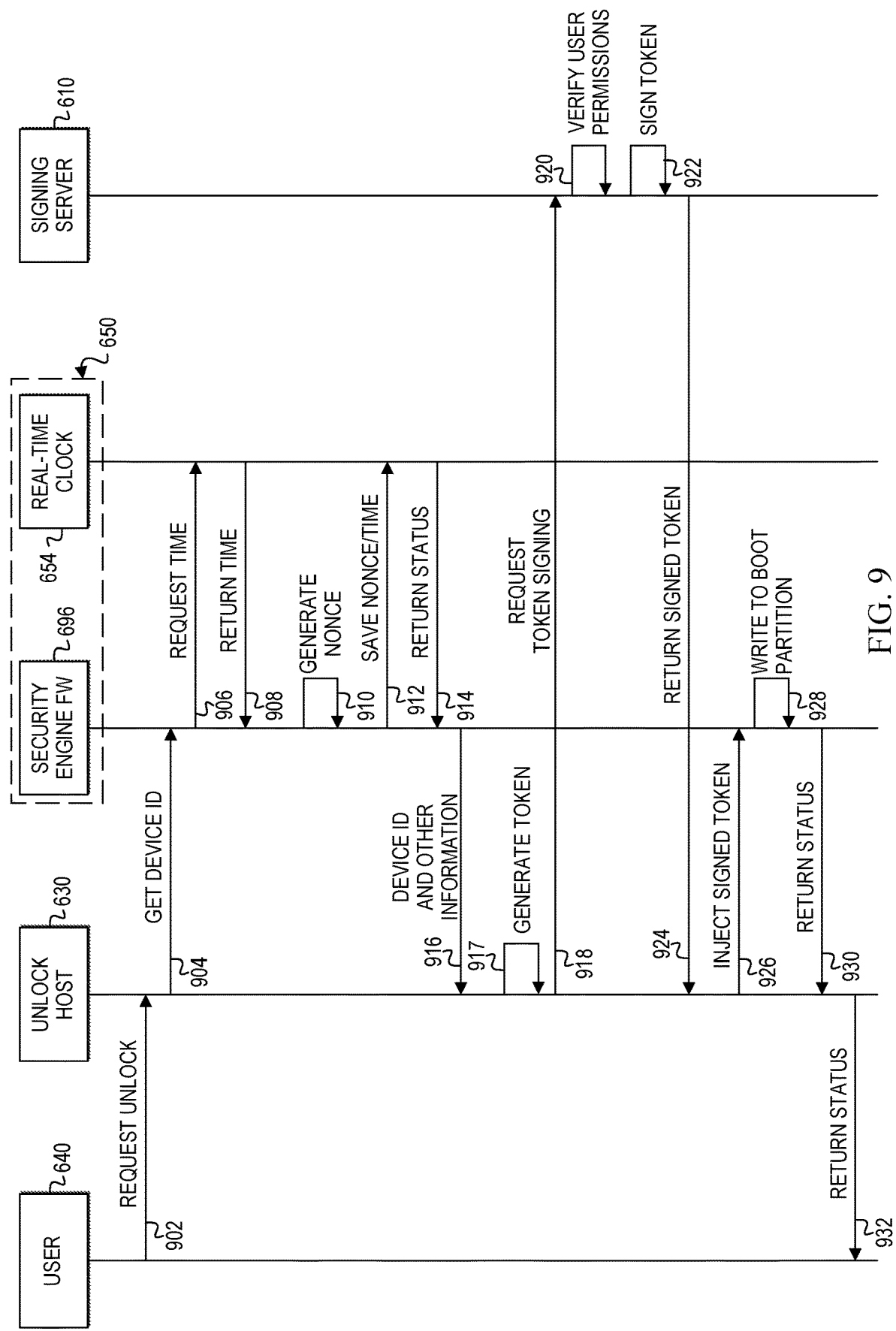
FIG. 9 is a simplified interaction diagram illustrating example interactions that may be associated with at least one embodiment of the present disclosure.

Turning to FIG. 9, FIG. 9 is a simplified interaction diagram of secure unlock system 600, according to at least one embodiment. FIG. 9 illustrates potential communications between user 640 and certain components in the system including unlock host 630, security engine firmware (FW) 696 of device 650, real-time clock 654 of device 650, and signing server 610. The interactions of FIG. 9 show an example flow for provisioning a token in the device. The interactions may occur at a manufacturer's premises during or subsequent to the completion of the manufacturing flow. In this scenario, unlock host 630 and signing server 610 are systems controlled and/or managed by the manufacturer. The interactions may also occur when the device is provided to another entity (e.g., OEM) and that entity has a need to access the device for debug or another use that requires one or more privileged features to be unlocked. In this scenario, unlock host 630 and signing server 610 are systems controlled and/or managed by the other entity (e.g., OEM).

At 902, a user accesses unlock host 630 to request unlocking of device 650. The unlock host may require appropriate authentication using credentials provided to the user by the entity associated with the unlock host (e.g., manufacturer, OEM). In at least one scenario, the user may access the unlock host 630 via any suitable user interface such as a mouse, keyboard, touch pad, touch screen, trackball, etc. At 904, unlock host 630 requests the device ID from security engine FW 696 of device 650. Security engine FW 696 requests the current time from real-time clock 654 of the device, and at 908, the real-time clock returns the current time.

Security engine FW 696 generates a nonce at 910, at least partly in response to receiving the request for the device ID. Nonce 910 can be generated randomly using a hardware-based random number generator in response to the request for a device ID. Security engine FW 696 causes the nonce and current time to be saved in the device. In one example, at 912, security engine FW 696 communicates with real-time clock 654 to save the nonce and time. At 914, a status related to the saved data is returned to the security engine FW 696 from real-time clock 654.

Security engine FW 696 can obtain a device ID of the device from an aggregator (e.g., 680) in the device. In at least one embodiment, when the device boots, the aggregator device ID may be downloaded from fuses of the device to the aggregator, where the aggregator device ID is cached or otherwise temporarily stored until it is requested by unlock host 630. At 916, security engine FW 696 sends the aggregator device ID and other information to unlock host 630. The aggregator device ID and at least some of the other information can be used to generate a token device ID by unlock host 630. In at least one embodiment, the other information can include a token structure identifier, a firmware version, a platform identifier (e.g., keyword indicating a particular project, product generation, product segment, etc.), and a device ID parameter list. The device ID parameter list can include an aggregator device ID, the nonce generated by the device, and the timestamp returned from the real-time clock at 908. In another embodiment, the token device ID can be computed by security engine FW 696 and provided to unlock host 630. In this implementation, the token device ID may be stored on the device for future use in the token verification process further described herein with reference to FIG. 12.

At 917, unlock host 630 generates a token. In one example, the token can have the same or similar configuration as token structure 800 of FIG. 8, including a token header, token properties, and a token payload. A token header (e.g., 810) can include the token version, token size, and security version number (SVN). SVN indicates the correct signing keys to be used. The token properties of the token generated at 917, includes a payload type and size, the device ID (e.g., token device ID or aggregator ID or both), the nonce, the timestamp, and an expiration parameter. If the token device ID is included in the token properties, it may be computed by unlock host 630 based on the aggregator device ID, the nonce, and the keyword, received at 916. In other embodiments, the token device ID may have been computed by security engine FW 696 and provided to unlock host 630 at 916.

The expiration parameter together with the timestamp can define how long the token may remain valid. The expiration parameter could be configured in numerous different ways including, but not necessarily limited to, a future timestamp indicating the date and time when the token is no longer valid or a number of seconds, minutes, hours, etc. indicating the amount of time after the timestamp during which the token remains valid. The expiration parameter may be desirable to avoid giving a particular user, or entity such as a third-party vendor, an unlimited amount of time for using privileged features that are unlocked by the token.

If the token is to be applicable to a group of devices, then unlock host 630 can add the device IDs, nonces, and timestamps for each of the other devices in the group to the token properties in the token. This information for the other devices may have been previously obtained by unlock host 630 for each device. The token properties may also indicate how many device IDs are listed in the token properties.

The token payload can include unlock data that indicates which privileged features can be unlocked and how they are unlocked (e.g., enabled, disabled, etc.). In one example, unlock data can be configured using a token generation tool, such as token generator 636, which enables a user to select particular privileged features to be included in the token payload. For example, a token being generated for a first group of devices to be further developed or enhanced by Vendor A may be given a different set of unlock data than the unlock data in a token payload generated for a second group of devices to be further developed or enhanced by Vendor B. In another scenario, if the first group of devices is provided to Vendor B for additional development/enhancement after Vendor A completes its development/enhancement, then a new token can be created for the first group of devices with new unlock data specific to Vendor B.

Once the token is generated, at 918, unlock host 630 sends the token to signing server 610 with a request to sign the token. At 920, the signing server verifies user permissions for signing a token. Thus, only authorized users may be allowed to get tokens signed by signing server 610. This authorization can be managed by whatever entity is creating the token (e.g., manufacturer, OEM, etc.). If the user permissions are not verified, then an error message can be returned and the token is not signed (not shown).

If the user permissions are verified, however, then at 922, the token is signed. In at least one embodiment, the signing server securely stores (or has access to) a private key of an asymmetric key pair for signing the token. The asymmetric key pair can include a private key for signing the token and a public key for converting the signature back to its original form. In one example, the signature can be generated by using the private key to sign portions of the token (e.g., 840a-840b). In at least some embodiments, signing the token portions with the private key can include applying a hash function to the selected token portions (e.g., 840a-840b) to create a hash value, and encrypting the hash value with the private key to create the signature. The signature is then added to the token header, along with the public key. In another implementation, the unlock host inserts the public key into the token header.

After the token is signed, at 924, signing server 610 sends the signed token back to unlock host 630. At 926, the unlock host can issue a command to inject the token into the boot partition. At 928, security engine FW 696 writes the signed token to the boot partition of the device. At 930, the security engine FW can return a status of the write operation to the unlock host. At 932, the status can be returned to the user for example, by displaying the status on a display indicating whether the signed token was successfully injected into device 650.

FIG. 9 illustrates one possible flow for token generation and injection into a device to enable the unlocking of privileged features of the device, according to at least one embodiment. As illustrated in the flow, the device has a security engine FW (e.g., 696) to generate the ephemeral device ID and inject the token into the device by storing the token in the boot partition of the device. However, injection is not restricted to only the flow of FIG. 9. Injection can also be achieved using a host process of the device to communicate with the embedded security engine to get the device ID and request the signed token to be stored in the boot partition. A host process of the device is intended to mean a CPU/system partition running the device operating system (e.g., Windows, Android, etc.).

Figure 10A:
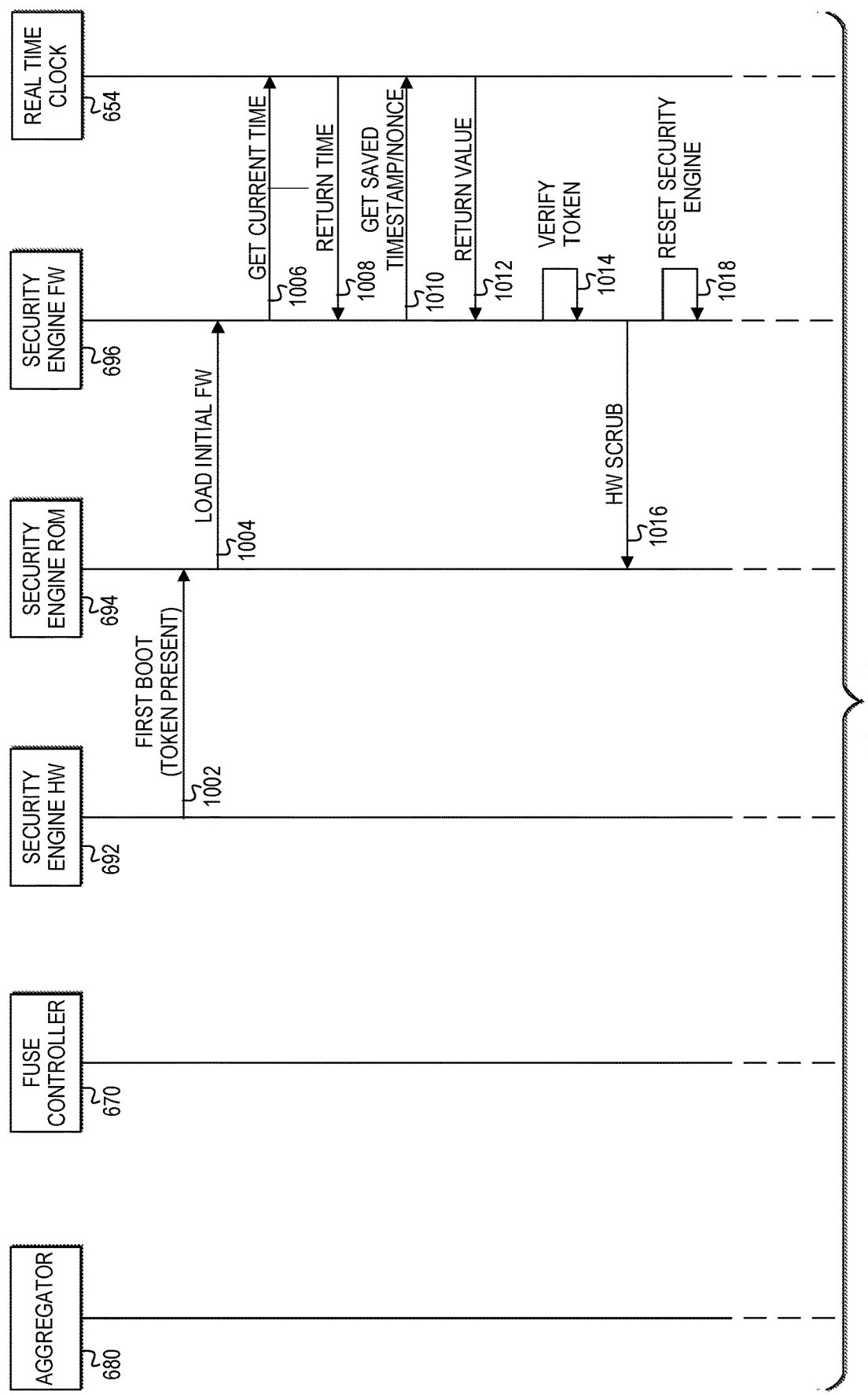
FIGS. 10A-10B provide a simplified interaction diagram illustrating example interactions that may be associated with at least one embodiment of the present disclosure.
Figure 10B:
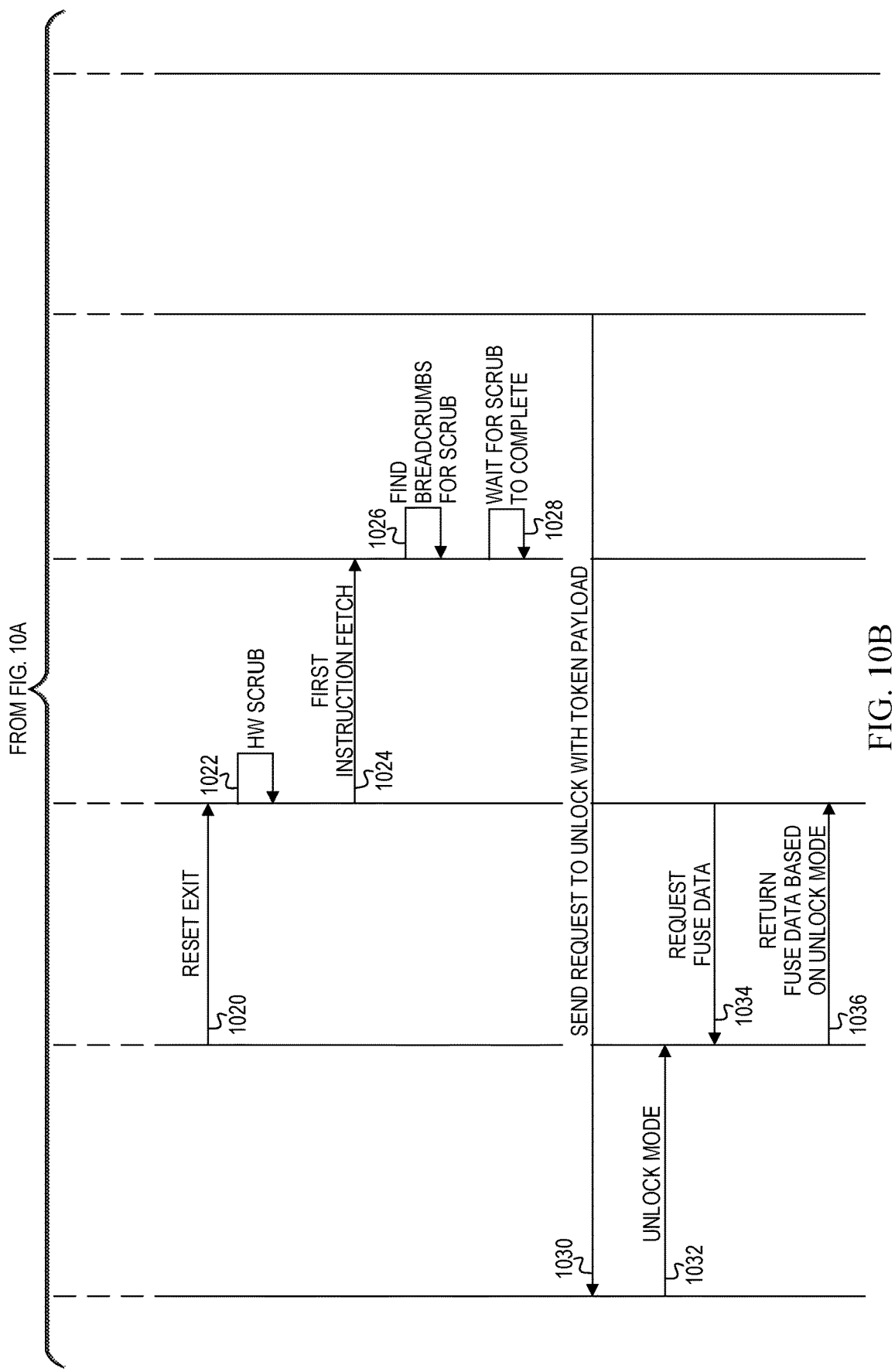

Turning to FIGS. 10A-10B, a simplified interaction diagram of secure unlock system 600 is illustrated, according to at least one embodiment. FIGS. 10A-10B illustrate potential communications between components of device 650, including aggregator 680, fuse controller 670, security engine HW 692, security engine ROM 694, security engine FW 696, and real-time clock 654. The interactions of FIGS. 10A-10B show an example flow that may occur subsequent to device 650 being provisioned with a signed token as shown in FIG. 9, or subsequent to a signed token being generated and stitched into a firmware image that can be used to boot device 650. Specifically, FIGS. 10A-10B, illustrate example interactions that may occur when a user initiates a use session for device 650. A use session could include, but is not necessarily limited to, debugging, testing, validating, provisioning, prototyping, and/or analyzing.

In FIG. 10A, at 1002, device 650 boots with a token present, either injected in the boot partition of the device, or included in a firmware image used by the boot partition to boot the device. At 1004, the initial firmware is loaded from security engine ROM 694. At 1006, security engine FW 696 requests the current time from real-time clock 654, which is returned by the real-time clock at 1008. At 1010, security engine FW 696 requests the saved timestamp and nonce from real-time clock 654, both of which are returned by the real-time clock at 1012. In other implementations, the device may be connected, or otherwise have access, to another system with data storage where the timestamp and nonce are stored.

At 1014, the token is verified. Generally, the signature, a hash of token contents, the device ID, the nonce, and the timestamp are evaluated to determine whether the token is verified. Details of this verification process is more described in more detail with reference to FIG. 11. If the token is not verified at 1014, then device 650 just continues with a normal boot.

If the token is verified at 1014, operations and interactions at 1016-1028 offer one possible implementation in which secrets (e.g., keys such as an enhanced privacy identification key, etc.) on the platform are scrubbed, or hidden, to ensure they are not revealed when privileged features on the device are unlocked and used by a user. In this example, once the token is verified at 1014, the security engine HW 692 is set up with breadcrumbs that are read upon reset of the device. Breadcrumbs inform the security engine 690 that the token has already been verified and the unlock mode has been determined. At 1016, a hardware scrub of security engine ROM 694 is requested by security engine FW 696. At 1018, the security engine is reset by security engine FW 696. At 1020, in FIG. 10B, a reset exit indicates that fuse controller 670 is being set up. At 1022, the security engine HW performs a hardware scrub of fuses to prevent any secrets contained in the fuses from being accessed when the device is unlocked. At 1024, a first instruction is fetched from security engine ROM 694 by security engine HW 692. At 1026, breadcrumbs are found for the hardware scrub. Breadcrumbs include information inserted in the security engine ROM to mark places where modifications or other changes are to be avoided. At 1028, a hardware scrub of the security engine ROM 694 is performed.

Once the fuses and security engine are scrubbed, at 1030, security engine FW 696 sends a request to aggregator 680 to unlock the device based on the token payload. Specifically, unlock data in the token payload is applied to unlock privileged features. In one example, policy generator 652 can generate policies based on the unlock data in the token payload. At 1032, aggregator 680 provides the unlock mode to fuse controller 670 so that fuse controller 670 knows what fuse data can be accessed. At 1034, security engine HW 692 can request fuse data from fuse controller 670, which may normally be locked and inaccessible to security engine 690. Because an unlock mode has been activated in the device, at 1036, fuse controller 670 sends fuse data back to the security engine HW 692 based on what data is indicated as being unlocked by the particular unlock mode that has been activated. Because the activated unlock mode is used to determine what fuses are sent out to the security engine 690, this ensures that the hardware automatically takes care of the security of the secrets based on the unlock mode.

Figure 11:
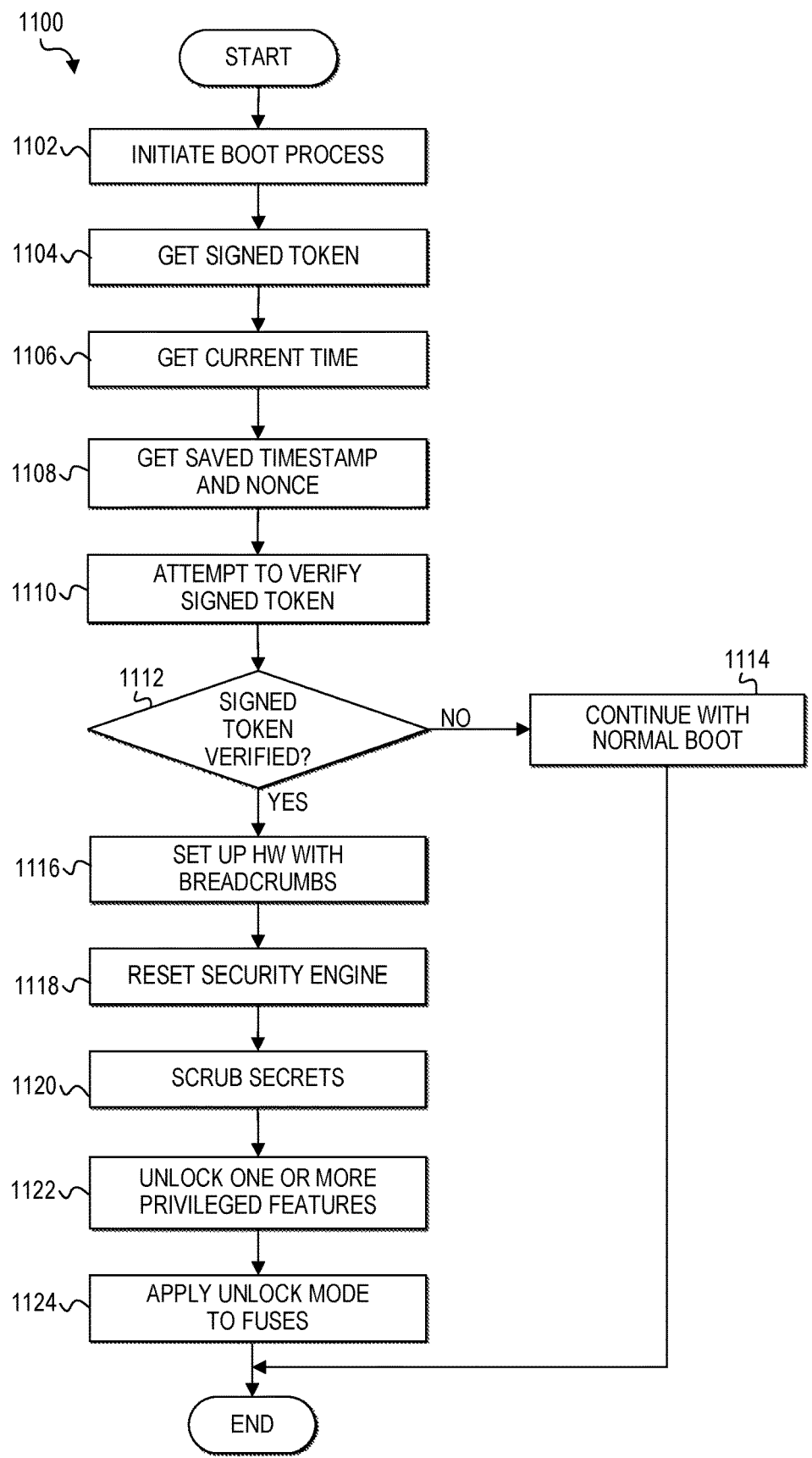
FIG. 11 is a simplified flowchart illustrating example operations that may be associated with at least one embodiment of the present disclosure.

FIG. 11 is an example flowchart illustrating a possible flow 1100 of operations that may be associated with embodiments described herein. In at least one embodiment, a set of operations corresponds to activities of FIG. 11. In at least one embodiment, various components of device 650, or portions thereof, may utilize the set of operations. Device 650 may comprise means such as processor 659, for performing the operations. In at least one embodiment, flow 1100 is one example of the flow of device 650 during a boot process, where the device was previously injected with a signed token to enable the unlocking of one or more privileged features on the device.

In the example of FIG. 11, at 1102, a boot process is initiated. A boot process initiates after the device is powered on. The boot process can initialize the hardware of the device and can load the operating system for the device. At 1104, the signed token stored in the device is retrieved (e.g., read, requested and received, or otherwise obtained). At 1106, the current time is obtained from a real-time clock on the device. At 1108, a timestamp and nonce, which were generated and saved during a process to generate the token, are obtained. The timestamp and nonce may be stored on the device in at least one embodiment. In other embodiments, they may be stored in a separate storage element coupled to the device with a direct communication link or via some network.

At 1110, an attempt is made to verify the signed token. The verification process ensures that the signed token is verified for authenticity (based on its signature), integrity (based on a hash of its contents), device specific (based on its device ID), and expiration (based on a nonce and/or time). Additional details related to the verification process for the token are shown and described herein at least with reference to FIG. 12. At 1112, a determination is made as to whether the verification was successful. If the signed token was not verified, then at 1114, the device can continue with a normal boot, and no privileged features on the device are unlocked.

If the signed token is determined to be verified at 1112, then at 1116, breadcrumbs are inserted in the hardware to inform the security engine that the signed token has already been verified and the unlock mode has been determined. At 1118, the security engine is reset. At 1120, secrets and confidential information (e.g., manufacturer secrets such as keys, etc.) that must not be accessible, even in an unlocked state, are scrubbed (or hidden) so that they cannot be found when unlocked privileged features are used. Once the secrets are scrubbed, one or more privileged features are unlocked at 1122. The unlock data in the token payload of the token is applied to unlock the privileged features. At 1124, the unlock mode indicated by the unlock data is applied to the fuses to determine which fuses can be sent to the security engine. Thus, the hardware automatically protects the security of the secrets based on the unlock mode.

Figure 12:
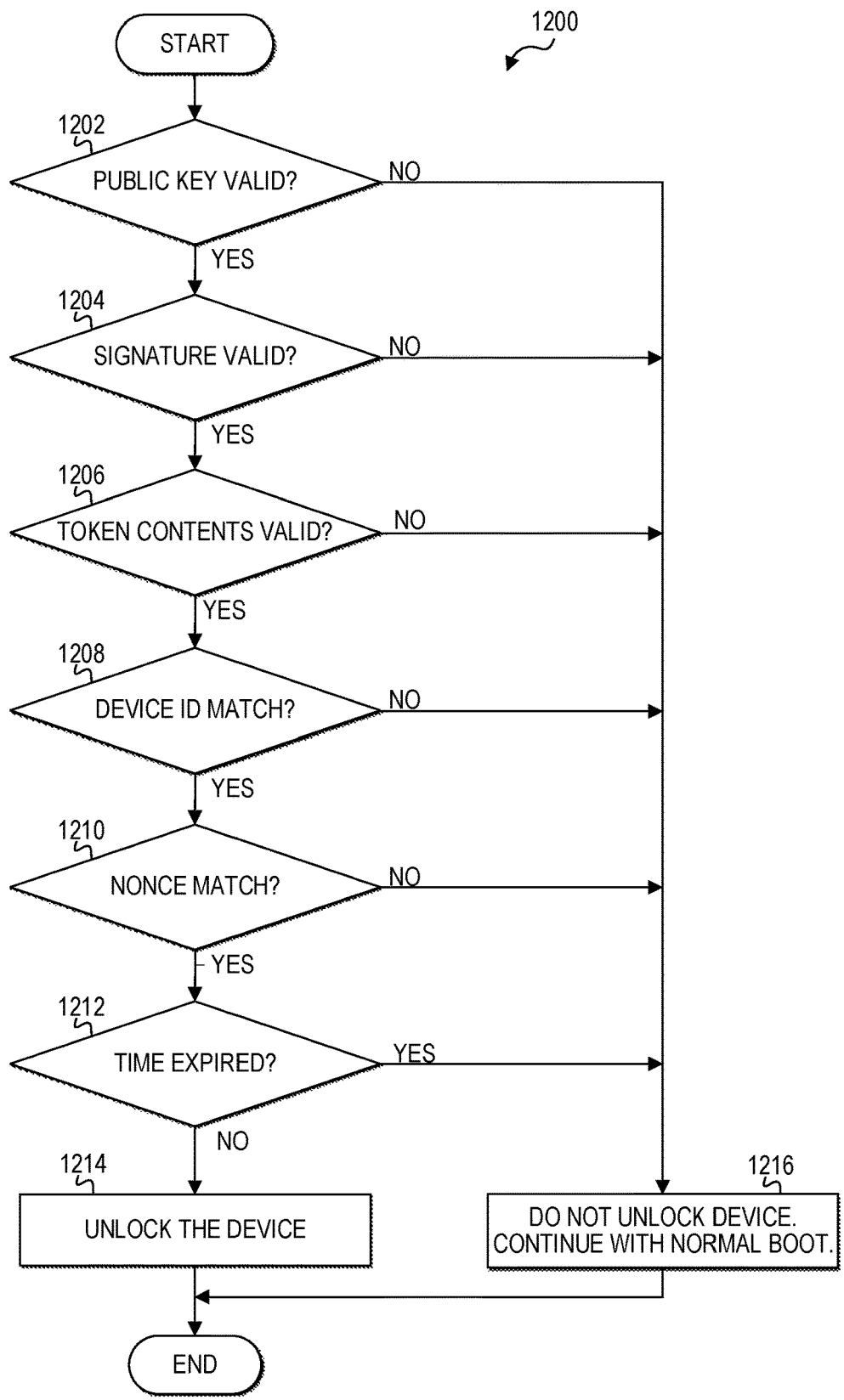
FIG. 12 is a simplified flow chart illustrating further example operations that may be associated with at least one embodiment of the present disclosure.

FIG. 12 is an example flowchart illustrating a possible flow 1200 of operations that may be associated with embodiments described herein. In at least one embodiment, a set of operations corresponds to activities of FIG. 12. In at least one embodiment, security engine FW 696, or a portion thereof, may utilize the set of operations. Security engine FW 696 may comprise means such as processor 659, for performing the operations. In at least one embodiment, flow 1200 is one example of verifying a token, as shown at 1014 of FIG. 10A and 1110 of FIG. 11.

Generally, in flow 1200 evaluations are performed to determine the authenticity and integrity of the token. Determinations are made as to whether the signature in the token header of the token is valid (e.g., 1204) and whether the contents of the token read from the device are valid (e.g., 1206). A signature is determined to be valid if it is authentic (i.e., signed by the appropriate entity such as signing server 610). Contents of the token are determined to be valid if the contents have not been modified since the token was signed, thus maintaining their integrity. Determining the validity of a signature and contents of a token can be achieved using any number of different techniques and signature verification processes currently known or potentially developed in the future. Accordingly, the specific examples provided herein are for illustrative purposes and should not limit the scope or inhibit broad teachings of this application.

In the example of FIG. 12, at 1202, a determination is made as to whether the public key in the token header (e.g., in second segment 814) is valid. In this example, a hash of the public key is stored in device 650. The location of the hashed public key in the device may be identified. If the hashed public key is in an RoT key manifest, this indicates the key was stored by the manufacturer and the token is being used to unlock the device for a use session associated with the manufacturer. If the hashed public key is stored in a key manifest rooted with the key in IFP fuses, this indicates the hashed public key was stored by the OEM and the token is being used to unlock the device for a use session associated with the OEM.

To determine whether the public key in the token header is valid, a hash function is applied to the public key (e.g., 814) to create a hash value, which is compared to the hashed public key stored in the device. If the hashed values do not match, however, the public key in the token header is determined to be not valid and therefore the signature in the token header cannot be verified with that public key. In this scenario, the device is not unlocked and, at 1216, it can continue to boot normally. It should be noted that, although the public key is described as being hashed by a hash function, any suitable derivation function (e.g., hash function, encryption algorithm, other cryptographic or obfuscation function, etc.) can be used to generate a secured value of the public key. This secured value of the public key can be stored in device 650. The same derivation function can be applied to the un-altered public key in the token header and, at 1202, the secured values can be compared to determine whether they match or otherwise correspond.

If the hashed values match, however, then the public key in the token header is valid and can be used to determine whether the signature is valid at 1204. Determining whether the signature is valid can include determining whether it is authentic (e.g., created by signing server 610 using a private key). If the signature is determined not to be authentic or if it cannot be confirmed that the signature is authentic, then the signature is not valid. In this scenario, the device is not unlocked and, at 1216, it can continue to boot normally.

If it is verified that the signature was created by the signing server (e.g., 610) using a private key associated with the public key in the token header, then the signature is authentic and valid. Accordingly, if the signature is determined to be valid at 1204, then the token can be evaluated at 1206 to determine whether the token contents are valid. If the token contents are determined to have been modified since the token was signed, then the token contents are not valid. In this scenario, the device is not unlocked and, at 1216, it can continue to boot normally.

If, at 1206, a determination is made that the token contents have not been changed, then the token contents are valid and at 1208, the device ID in the token is evaluated to determine if the token was generated for that device. Depending on the implementation, either a token device ID or an aggregator device ID may be used for this evaluation. If a token device ID is used, then a token device ID from the token properties is compared to a token device ID previously computed and stored on the device (e.g., when the nonce was generated at 910), or contemporaneously computed during the verification process using values stored on the device (e.g., aggregator device ID, nonce, keyword). If the token device ID from the token does not match the stored or computed token device ID from the device, then the device is not unlocked and, at 1216, it can continue to boot normally. If the token device IDs match, however, then flow proceeds at 1210.

In another implementation, aggregator device ID from the token properties is compared to the aggregator device ID obtained from fuses of the device to determine whether they match. If the aggregator device ID from the token and the aggregator device ID from the device does not match, then the device is not unlocked and, at 1216, it can continue to boot normally. If the aggregator device IDs match, however, then flow proceeds at 1210. It should be noted that if multiple device IDs (e.g., token device IDs or aggregator device IDs) are specified in the token properties, then those device IDs can be searched to determine whether there is a match to the particular device ID (e.g., token device ID or aggregator device ID) obtained from the device.

If a match is found at 1208, then at 1210, the previously stored nonce obtained from the device (or from storage accessible to the device) can be compared to the nonce associated with the device ID identified in the token properties to determine whether the nonces match. If the nonces are determined to not match at 1210, then the device is not unlocked and, at 1216, it can continue to boot normally.

If the nonces are determined to match at 1210, then at 1212, an expiration parameter can be evaluated to determine whether the token has expired. The current time obtained from the device (e.g., 1006, 1106) can be compared to the timestamp associated with the device ID identified in the token properties. The timestamp associated with the identified device ID in the token properties and the current time obtained from the device can be used to determine the amount of time that has passed since the timestamp was generated for the device. The timestamp can be generated for a device when the token is generated, or when device IDs are obtained from other devices in the group. The resulting amount of time is compared to the expiration parameter (e.g., seconds, minutes, hours, etc.) from the token properties to determine whether the time allowed for the token has expired. For example, in one implementation, if the expiration parameter is less than or equal to the amount of time that was calculated based on the timestamp and the current time, then the token has expired. If it is determined that the token has expired based on the expiration parameter, then the device is not unlocked and, at 1216, it can continue to boot normally. If it is determined that the token has not expired based on the expiration parameter, then at 1214 the device is unlocked.

With reference again to 1204 and 1206, some specific possible examples are provided related to how a signature and token contents are determined to be valid. In a first example, the public and private keys are an asymmetric key pair. When the signing server 610 receives the token to be signed (e.g., 918), the server applies a one-way hash function (e.g., SHA-3, etc.) to certain contents of the token (e.g., 840*a* and 840*b*) to generate a hash value. The private key of the signing server can be used by an asymmetric cryptographic algorithm to sign (e.g., encrypt) the hash value to create a signature. For example, a Rivest-Shamir-Adleman (RSA) algorithm can be used, among other examples. The created signature is inserted into the token header, along with the public key of the key pair, before being passed back to the unlock host 630.

After the signed token is injected into the boot partition of a device, the device may be booted. The device obtains the signed token from the boot partition. The public key is read from the token header and used to decrypt the signature to generate a first hash value. The same hash function used by the signing server is applied to certain contents of the signed token (e.g., 840*a* and 840*b*) to obtain a second hash value. The second hash value is compared to the first hash value derived by decrypting the signature with the public key. If the first and second hash values match, then this validates that the contents of the token have not been changed since the token was signed. The signature is also validated as being authentic because the signature was created with a private key that corresponds to the public key used to decrypt the signature. If the first and second hash values do not match, then this indicates that either the contents have changed since the token was signed or the public key used to decrypt the signature does not correspond to the private key used to create the signature, or both.

In another possible example, the private key and public key may be symmetric. In this scenario, after the signed token has been injected into the boot partition of a device, the device may be booted. The device obtains the signed token from the boot partition. A public key is read from the token header and used to decrypt the signature to generate a first hash value. The same hash function used by the signing server is applied to parts of the signed token (e.g., 840*a* and 840*b*) to obtain a second hash value. The second hash value is compared to the first hash value derived by decrypting the signature with the public key. If the first and second hash values match, then this validates that the contents of the token have not been changed since the token was signed. If the first and second hash values are different, then the contents of the token have changed since the token was signed. To evaluate the authenticity of the signature, the second hash value is signed (e.g., encrypted) with the public key to create a second signature. The second signature is compared with the signature in the token header. If the signatures match, then the signature is also validated as being authentic. If the signatures do not match, then the signature in the header is determined to not be valid.

In an alternative embodiment, secure unlock system 600 may be combined with secure unlock system 100 to provide a particular embodiment that enables a manufacturer to control unlocking privileged features with a primary mechanism of secure fuse passwords, and a backup mechanism of using signed tokens when a customer cannot access the manufacturer's key store containing passwords and unique identifiers. For example, a device may be configured with a hashed password and unique identifier in its fuse bank during the manufacturing process, as previously described herein with reference to FIGS. 1-5. The password enables particular privileged features to be unlocked when a user accesses the device with unlock host (e.g., 130), establishes a network connection to the manufacturer's database with a key store (e.g., 110), and obtains the appropriate password to unlock the device, as previously described herein. In some scenarios, however, a customer such as an OEM may not be able to successfully access a manufacturer's database (e.g., database is down, network connection is unavailable, customer's network is down, etc.). In these scenarios, the customer may cease the particular desired activity, such as debugging, testing, validating, provisioning, prototyping, or analyzing the device, until a network session can be established or restored.

In an alternative embodiment, however, the device could also be configured with a signed token containing unlock data in its token payload, as previously described herein and particularly with reference to FIG. 9. The token may be signed by the manufacturer and the unlock data could include unlock data (e.g., configuration information) to unlock privileged features that the customer is authorized to access during a use session. When the password authentication fails, such as when a connection cannot be established to the manufacturer's database, for example, a security engine in the device may begin to verify the signed token, as previously described herein. Accordingly, the device can be unlocked for the customer according to the unlock data in the token payload. In one example, the unlock data may enable the unlocking of a limited set of privileged features, whereas the fuse password may enable a more expansive set of privileged features to be unlocked. In other embodiments, they may enable the same set of privileged features.

FIGS. 13-21 detail exemplary architectures and systems to implement embodiments of the above (such as devices 150, 650, unlock hosts 130, 630, fusing station 120, database infrastructure 110, signing server 610, etc.). In some embodiments, one or more hardware components and/or instructions described above are emulated as detailed below, or implemented as software modules. Other computer architecture designs known in the art for processors, mobile devices, computing systems, and components thereof may also (or alternatively) be used. Generally, suitable computer architectures for embodiments disclosed herein can include, but are not limited to, configurations illustrated in FIGS. 13-21.

Embodiments of the instruction(s) detailed above may be embodied in a "generic vector friendly instruction format." In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Figure 13:
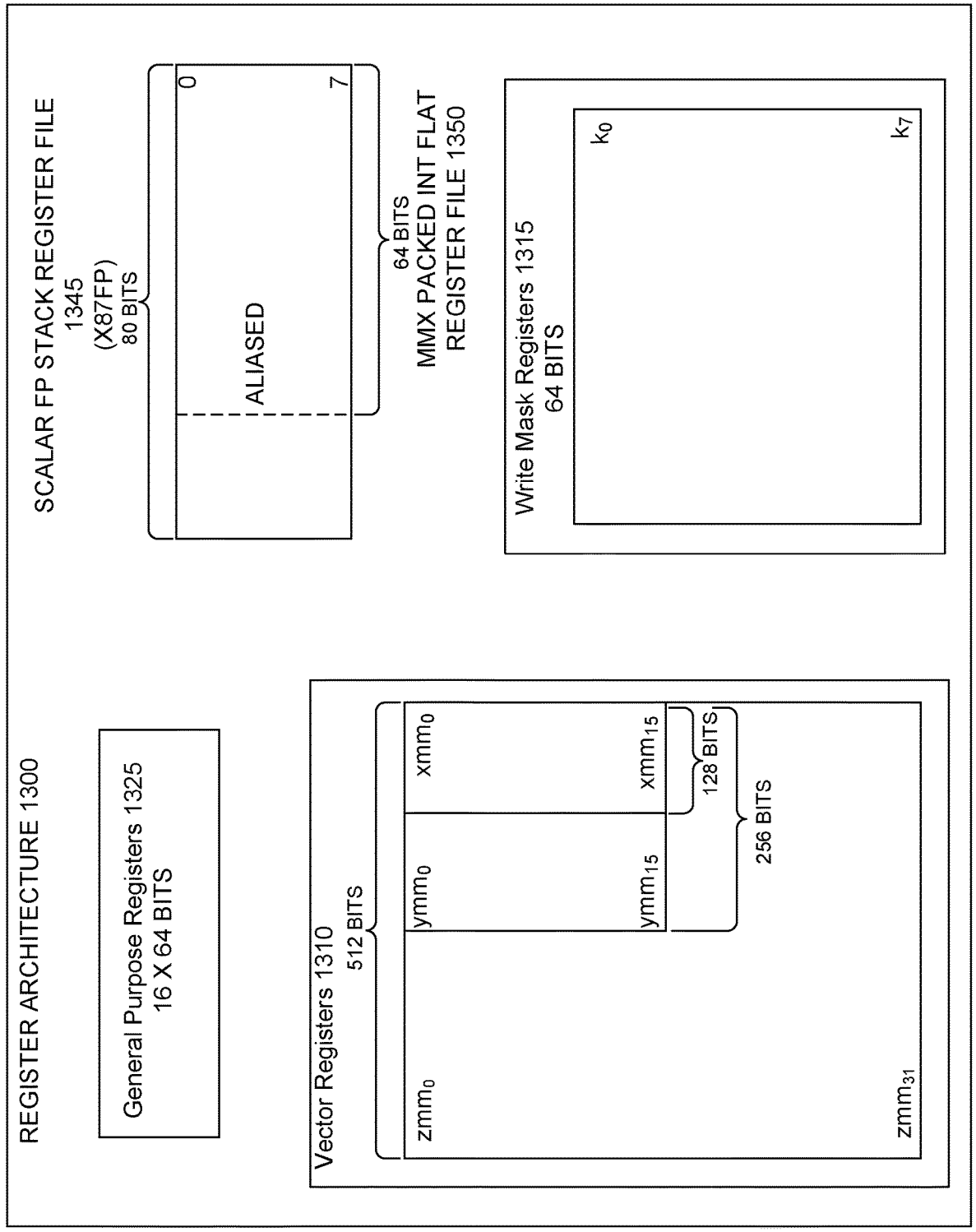
FIG. 13 is a block diagram of a register architecture according to one embodiment of the invention.
Figure 14:
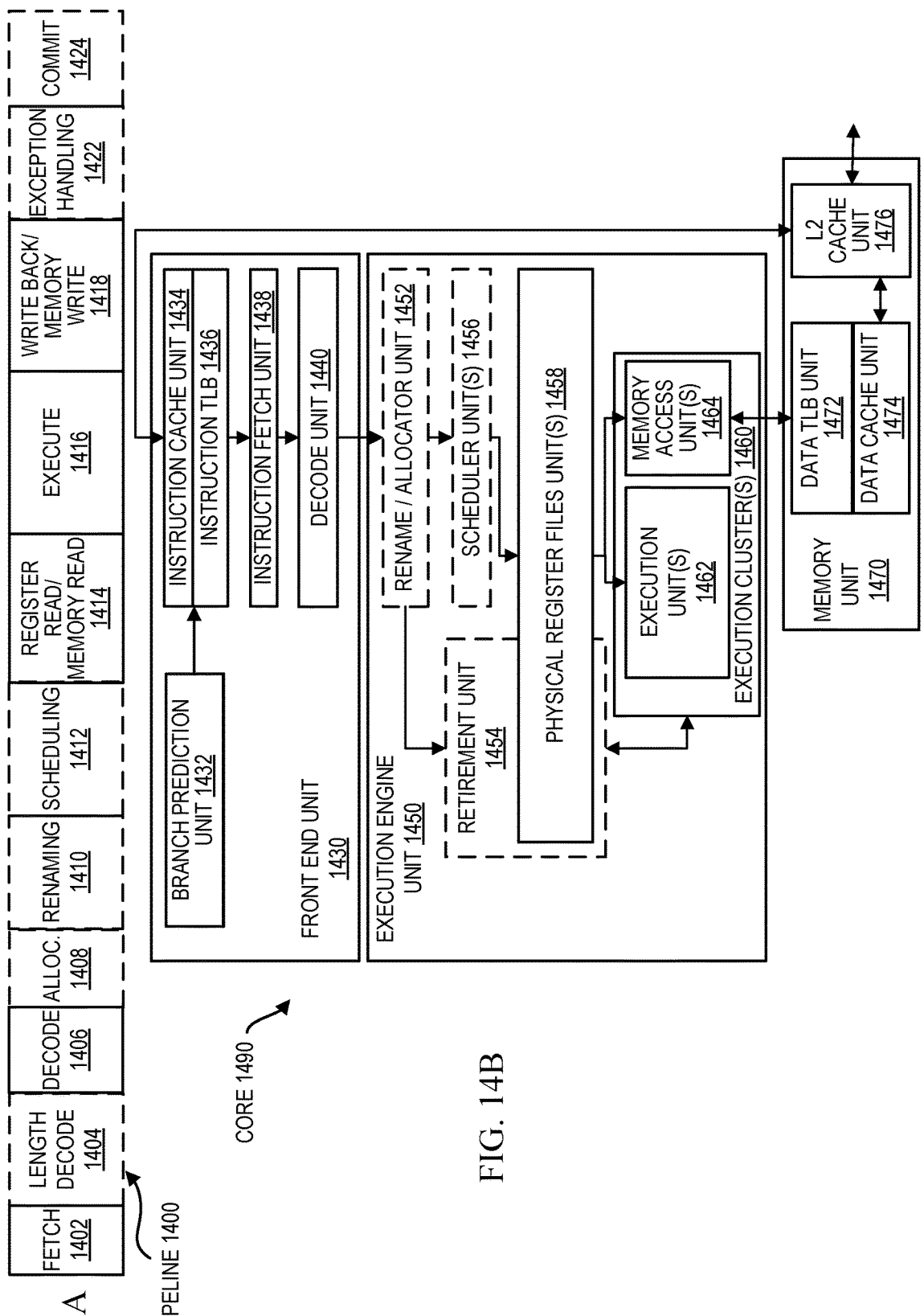
FIG. 14A is a block diagram illustrating both an exemplary in-order pipeline and an exemplary register renaming, out-of-order issue/execution pipeline according to embodiments of the present disclosure.
FIG. 14B is a block diagram illustrating both an exemplary embodiment of an in-order architecture core and an exemplary register renaming, out-of-order issue/execution architecture core to be included in a processor according to embodiments of the present disclosure.
Figure 15:
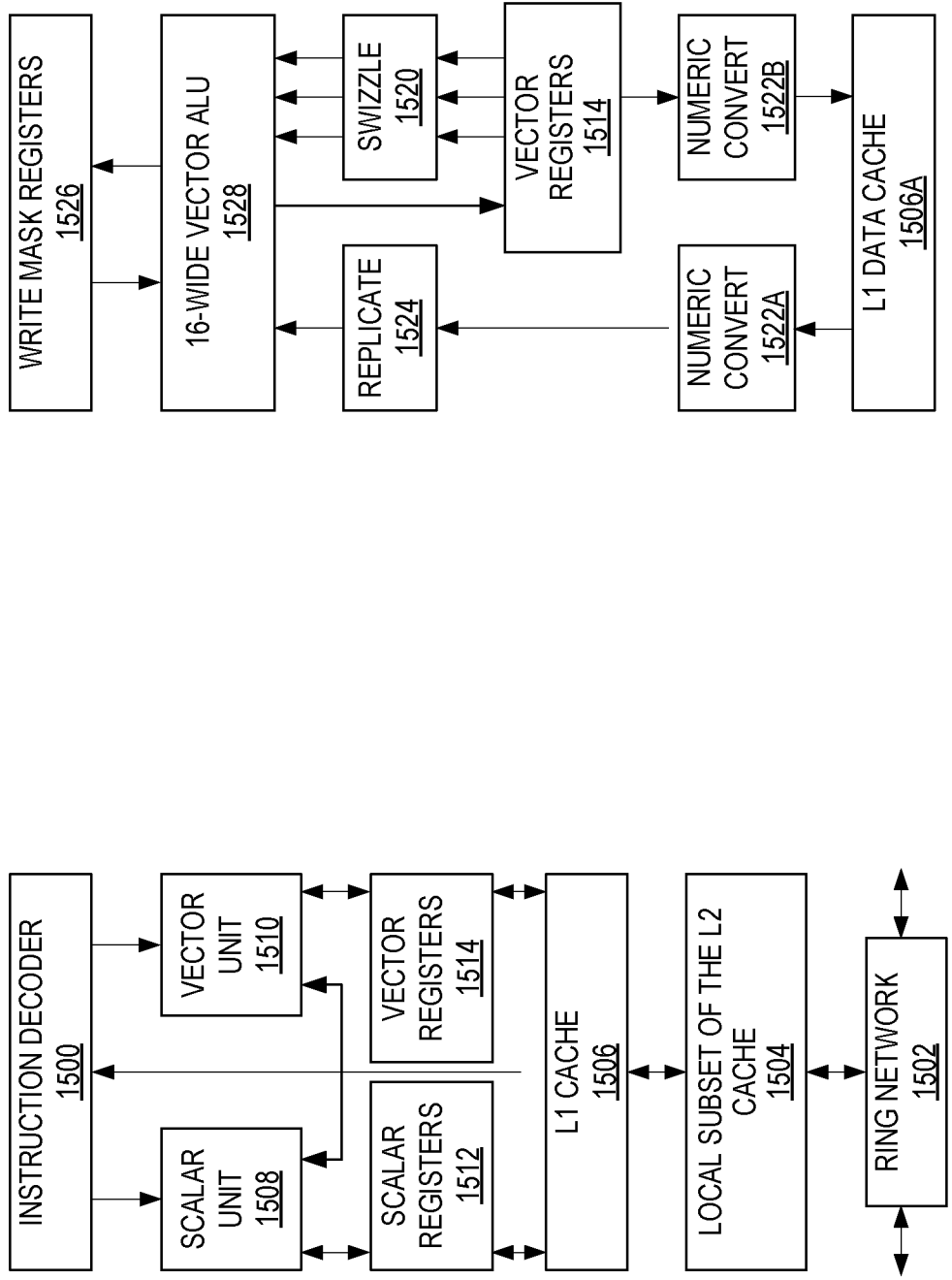
FIGS. 15A-15B illustrate a block diagram of a more specific exemplary in-order core architecture, which core would be one of several logic blocks (including other cores of the same type and/or different types) in a chip.

FIG. 13 is a block diagram of a register architecture 1300 according to at least one embodiment of the present disclosure. In the embodiment illustrated, there are 32 vector registers 1310 that are 512 bits wide; these registers are referenced as zmm0 through zmm31. The lower order 256 bits of the lower 16 zmm registers are overlaid on registers ymm0-15. The lower order 128 bits of the lower 16 zmm registers (the lower order 128 bits of the ymm registers) are overlaid on registers xmm0-15.

In other words, a vector length field selects between a maximum length and one or more other shorter lengths, where each such shorter length is half the length of the preceding length; and instructions templates without the vector length field operate on the maximum vector length. Further, in one embodiment, class B instruction templates of a specific vector friendly instruction format operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the present disclosure may use wider or narrower registers. Additionally, alternative embodiments of the present disclosure may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 14A is a block diagram illustrating both an exemplary in-order pipeline and an exemplary register renaming, out-of-order issue/execution pipeline according to one or more embodiments of this disclosure. FIG. 14B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions.

The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decode stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the scheduling stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIGS. 15A-15B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to one or more embodiments of this disclosure. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the present disclosure may use a different approach (e.g., use a single register set or include a communication path that allows data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network 1502 ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to one or more embodiments this disclosure. FIG. 15B includes an L1 data cache 1506A, part of the L2 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Figure 16:
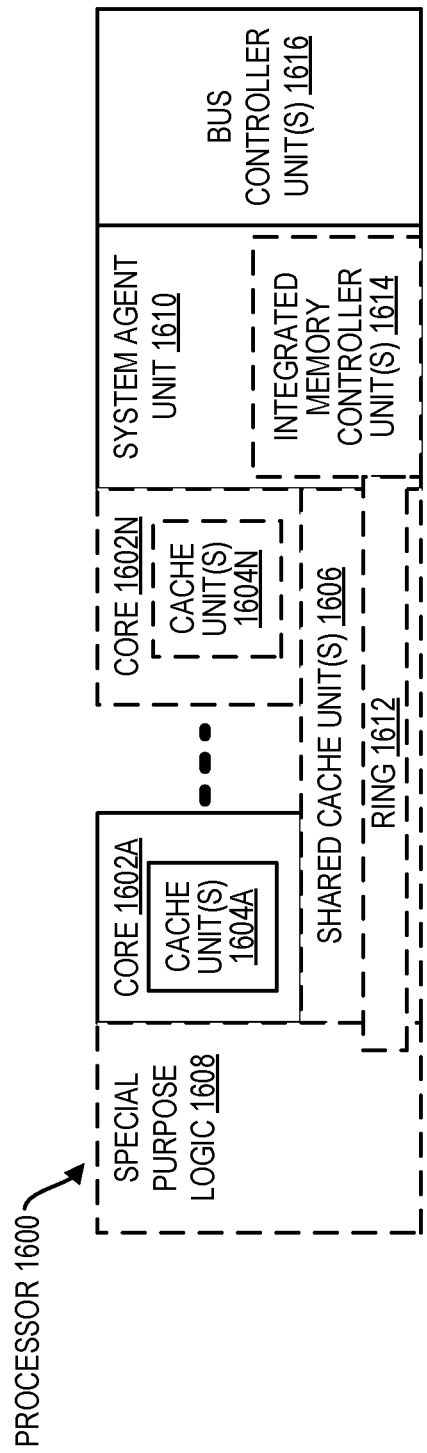
FIG. 16 is a block diagram of a processor that may have more than one core, may have an integrated memory controller, and may have integrated graphics according to embodiments of the present disclosure.

FIG. 16 is a block diagram of a processor 1600 that may have more than one core, may have an integrated memory controller, and may have integrated graphics according to one or more embodiment of this disclosure. The solid lined boxes in FIG. 16 illustrate a processor 1600 with a single core 1602A, a system agent unit 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the special purpose logic 1608 (e.g., integrated graphics logic), the set of shared cache units 1606, and the system agent unit 1610/ integrated memory controller unit(s) 1614, alternative embodiments may use any number of well-known techniques for interconnecting such units. In one embodiment, coherency is maintained between one or more cache units 1606 and cores 1602A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of executing the same instruction set, while others may be capable of executing only a subset of that instruction set or a different instruction set.

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
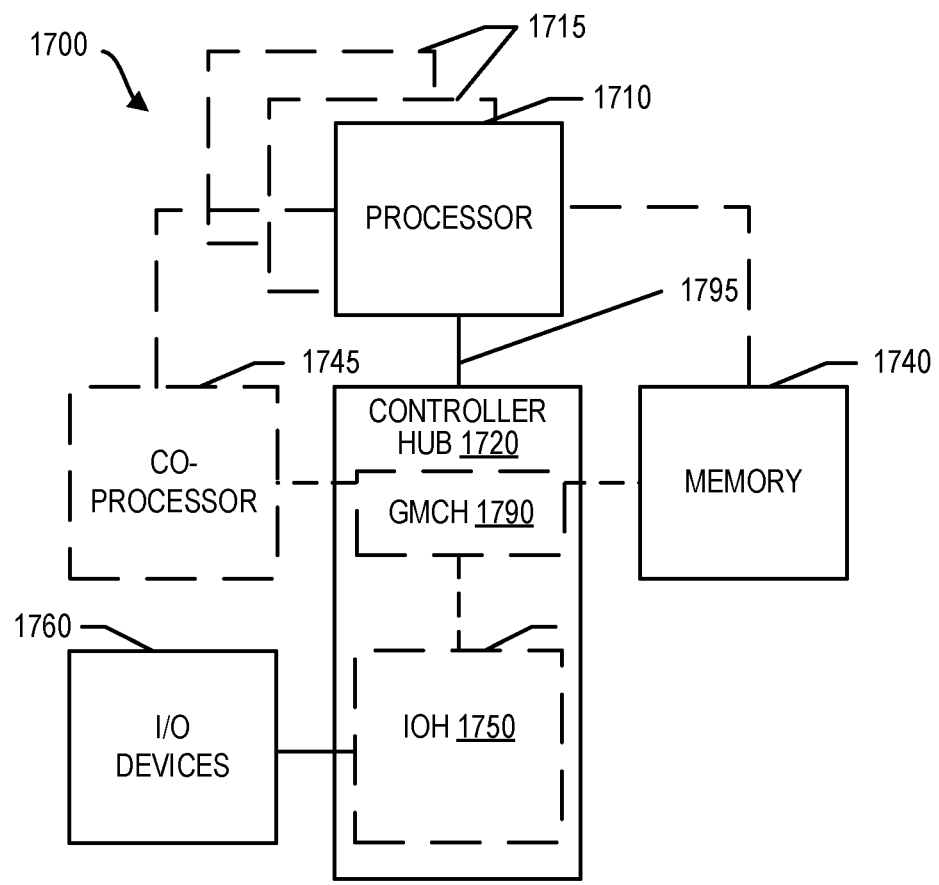
FIGS. 17-20 are block diagrams of exemplary computer architectures.

Referring now to FIG. 17, shown is a block diagram of a system 1700 in accordance with at least one embodiment of the present disclosure. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as QuickPath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor (s) 1745 accept and execute the received coprocessor instructions.

Figure 18:
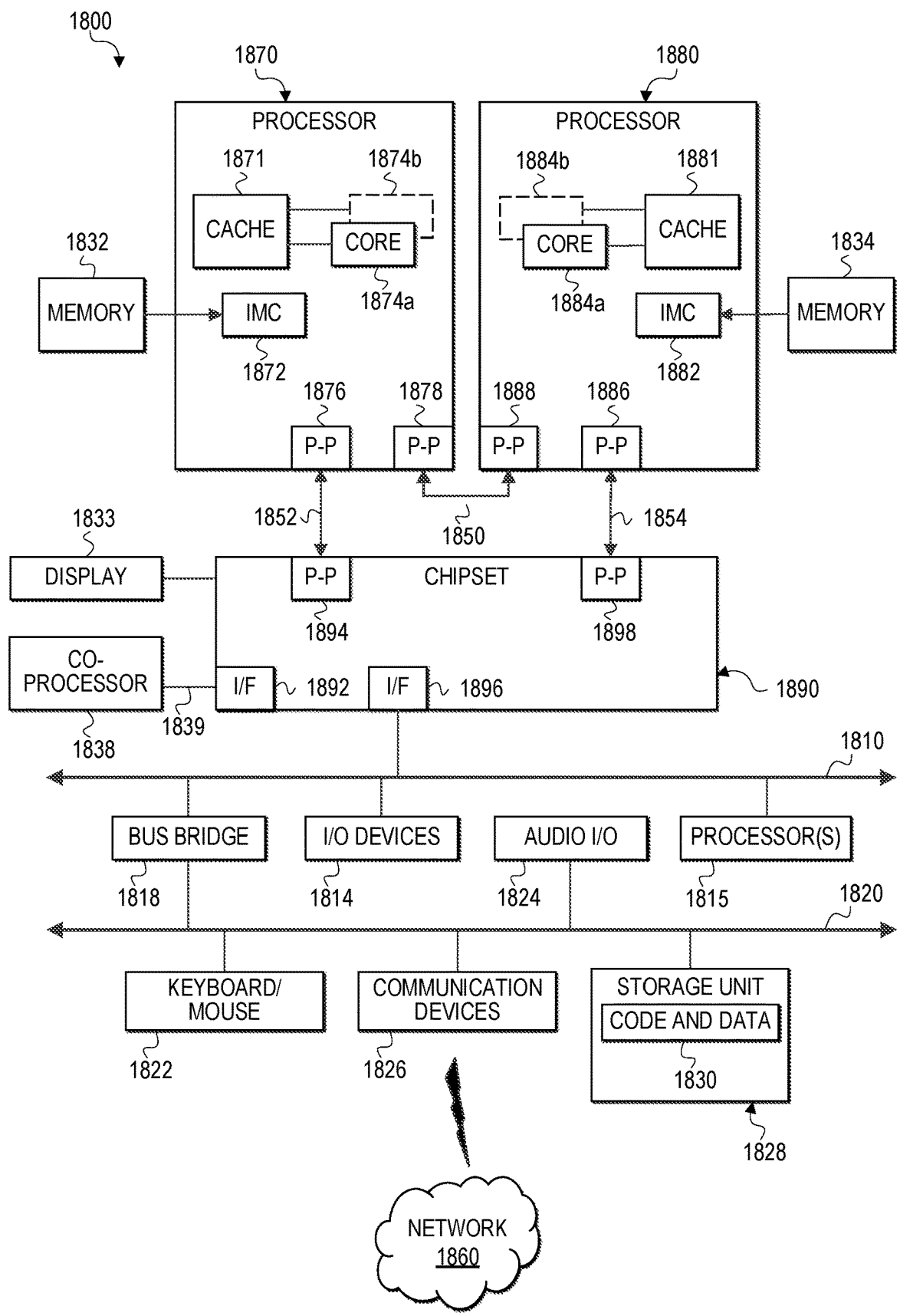

Referring now to FIG. 18, shown is a block diagram of a first more specific exemplary system 1800 in accordance with one or more embodiments of the present disclosure. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In at least one embodiment of this disclosure, processors 1870 and 1880 are respectively processors 1710 and 1715, while coprocessor 1838 is coprocessor 1745. In another embodiment, processors 1870 and 1880 are respectively processor 1710 and coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1810 via an interface 1896. In one embodiment, first bus 1810 may be a Peripheral Component Interconnect (PCI) bus, or a bus such as a PCI Express bus or another third generation I/O interconnect bus, although the scope of the present disclosure is not so limited.

As shown in FIG. 18, various I/O devices 1814 may be coupled to first bus 1810, along with a bus bridge 1818 which couples first bus 1810 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1810. In one embodiment, second bus 1820 may be a low pin count (LPC) bus. Various devices may be coupled to a second bus 1820 including, for example, a keyboard and/or mouse 1822, communication devices 1826 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
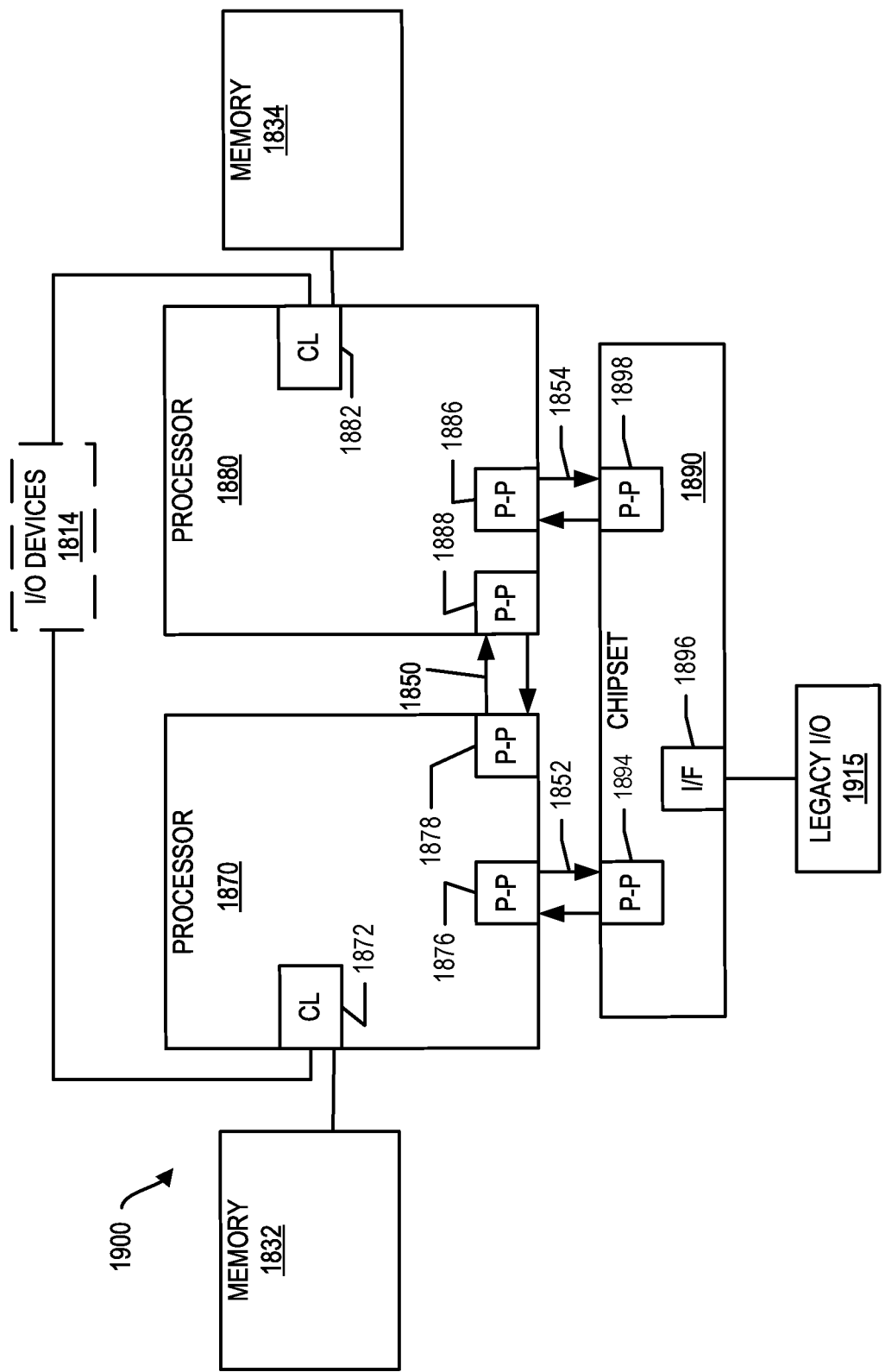

Referring now to FIG. 19, shown is a block diagram of a second more specific exemplary system 1900 in accordance with at least one embodiment of the present disclosure. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1814 are also coupled to the control logic 1872, 1882. Legacy I/O devices 1915 are coupled to the chipset 1890.

Figure 20:
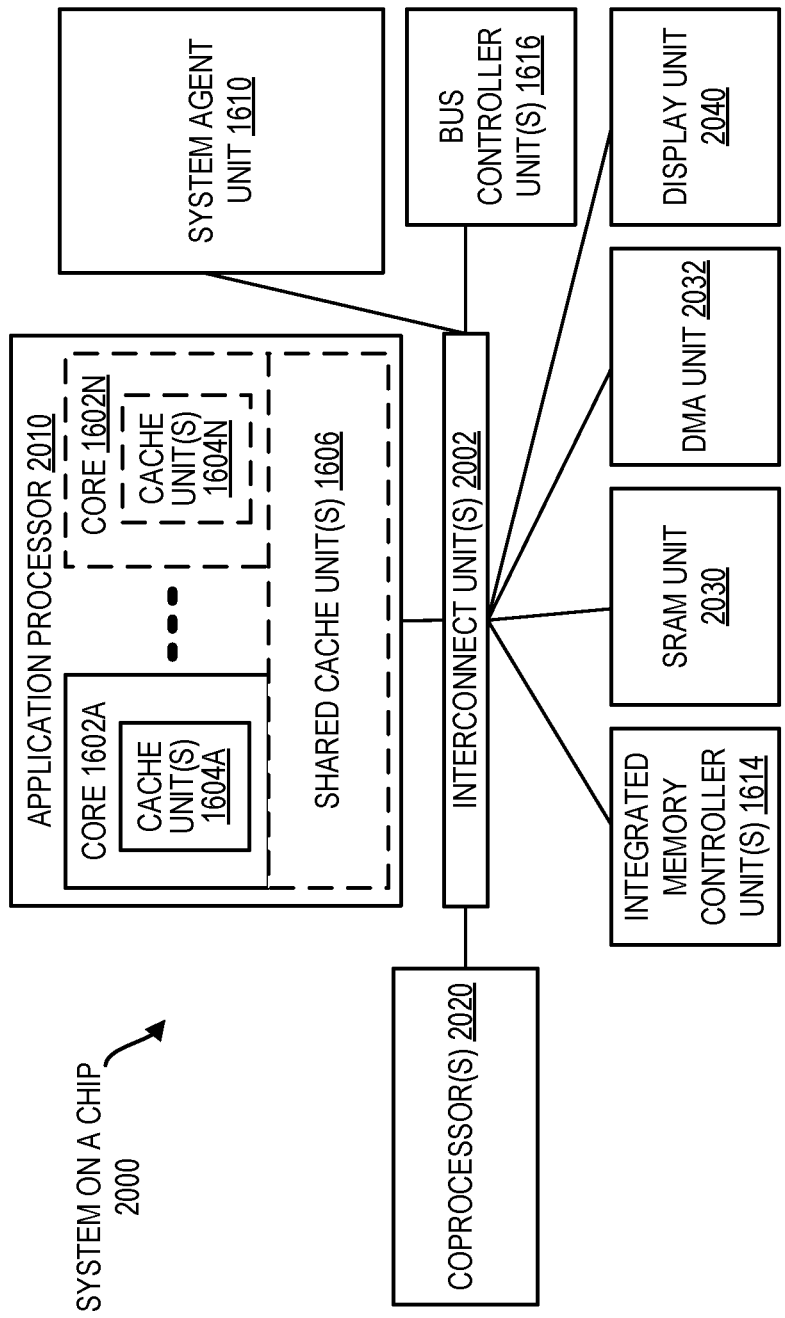

Referring now to FIG. 20, shown is a block diagram of a SoC 2000 in accordance with at least one embodiment of the present disclosure. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 1602A-N and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of this disclosure may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor, among other examples.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
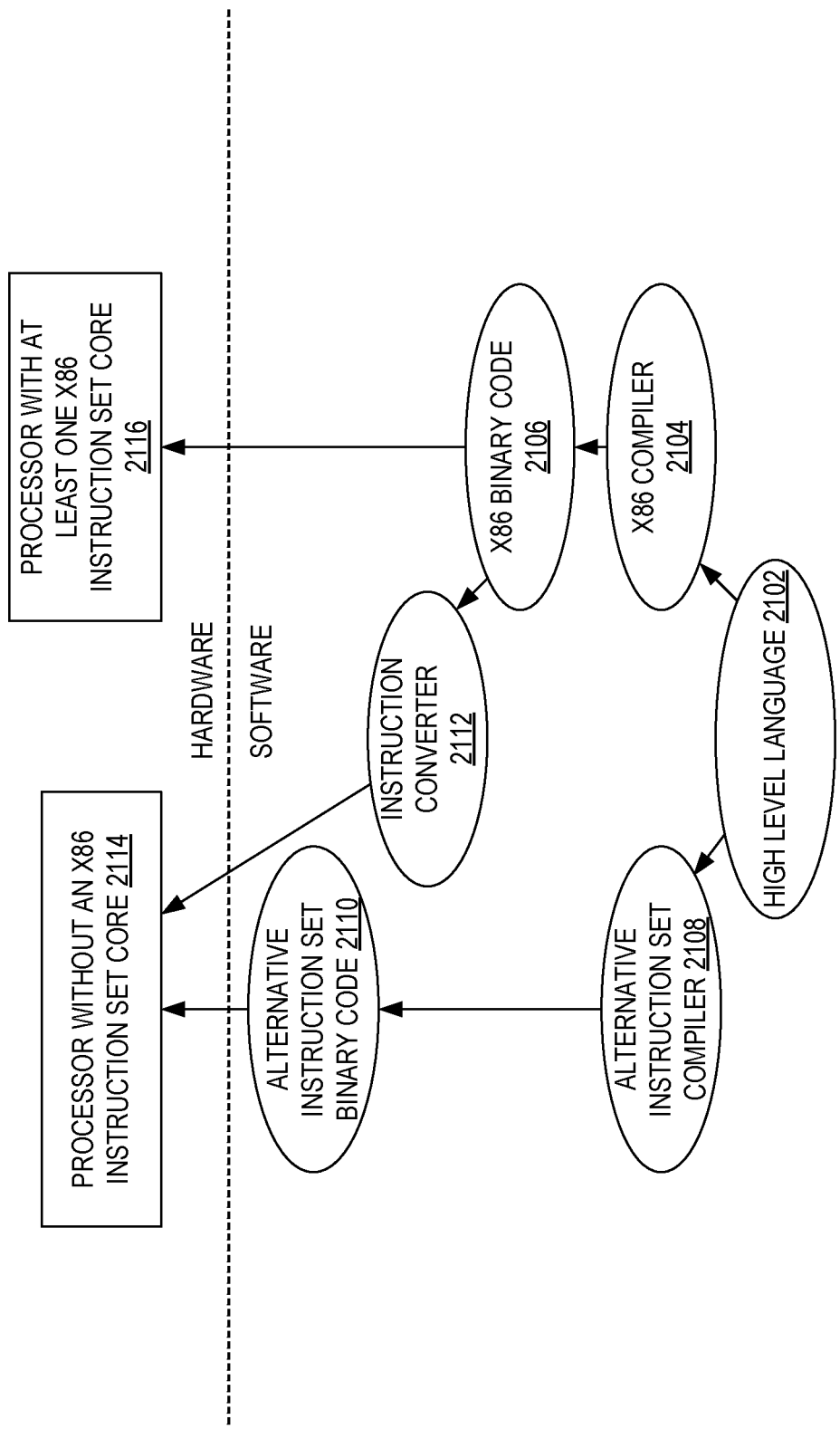
FIG. 21 is a block diagram contrasting the use of a software instruction converter to convert binary instructions in a source instruction set to binary instructions in a target instruction set according to embodiments of the present disclosure.

FIG. 21 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

Elements of FIG. 1, such as database infrastructure 110, fusing station 120, unlock host 130, and device 150, and elements of FIG. 6, such as signing server 610, unlock host 630, and device 630 may include software to achieve (or to foster) the device unlock functions, as outlined herein. Note that in one example, each of these elements can have an internal structure (e.g., processor 119, 129, 139, 159, 619, 639, 659 memory element 117, 127, 137, 157, 617, 637, 657, etc.) to facilitate some of the operations described herein. In other embodiments, these device unlock functions may be executed externally to these elements, or included in some other network element to achieve this intended functionality. Alternatively, network elements may include this software (or reciprocating software) that can coordinate with other network elements in order to achieve the operations, as outlined herein. In still other embodiments, one or several devices, hosts, or systems may include any suitable algorithms, hardware, software, firmware, components, modules, interfaces, or objects that facilitate the operations thereof.

Note that with the numerous examples provided herein, interaction may be described in terms of two, three, four, or more network elements, hosts, devices, computing systems, modules, and/or other components. However, this has been done for purposes of clarity and example only. It should be appreciated that the system can be consolidated or divided (e.g., segmented, partitioned, separated, etc.) in any suitable manner. Along similar design alternatives, any of the illustrated modules, nodes, elements, hosts, devices, systems, and other components of FIG. 1 may be combined in various possible configurations, all of which are clearly within the broad scope of this Specification. It should be appreciated that the systems of FIGS. 1 and 6 (and their teachings) are readily scalable and can accommodate a large number of components, as well as more complicated/sophisticated arrangements and configurations. Accordingly, the examples provided should not limit the scope or inhibit the broad teachings of the systems as potentially applied to a myriad of other architectures.

It is also important to note that the operations described with reference to the preceding FIGURES illustrate only some of the possible scenarios that may be executed by, or within, the systems (e.g., 100, 600). Some of these operations may be deleted or removed where appropriate, or these operations may be modified or changed considerably without departing from the scope of the discussed concepts. In addition, the timing of these operations may be altered considerably and still achieve the results taught in this disclosure. As one example, the processes depicted in the accompanying figures do not necessarily require the particular order shown, or sequential order, to achieve the desired results. In certain implementations, multitasking and parallel processing may be advantageous. The preceding operational flows have been offered for purposes of example and discussion. Substantial flexibility is provided by the system in that any suitable arrangements, chronologies, configurations, and timing mechanisms may be provided without departing from the teachings of the discussed concepts.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z. Additionally, unless expressly stated to the contrary, the numbering adjectives 'first', 'second', 'third', etc., are intended to distinguish the particular terms (e.g., element, condition, module, activity, operation, claim element, etc.) they precede, but are not intended to indicate any type of order, rank, importance, temporal sequence, or hierarchy of the modified term. For example, 'first X' and 'second X' are intended to designate two separate X elements that are not necessarily limited by any order, rank, importance, temporal sequence, or hierarchy of the two elements. Also, references in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments of the subject matter disclosed herein. Certain features that are described in this specification in the context of separate embodiments can also be implemented in combination in a single embodiment. For example, secure unlock system 100 and secure unlock system 600 may be combined in an alternative embodiment as previously described herein, and in other ways that may not be specifically outlined herein. Conversely, various features that are described in the context of a single embodiment may also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

OTHER NOTES AND EXAMPLES

The following examples pertain to embodiments in accordance with this specification. Example T1 provides an apparatus, a system, one or more machine readable mediums, a method, and/or hardware-, firmware-, and/or software-based logic for unlocking at least a portion of a device, where the Example of T1 includes a fuse controller for storing a unique identifier of the device and a first secured value computed from a first password associated with the unique identifier; an aggregator coupled to the fuse controller to: receive the unique identifier and the first secured value from the fuse controller; send the unique identifier to an unlock host; receive a second password from the unlock host; compute a second secured value of the second password using a security function; and unlock one or more privileged features on the device based on the first secured value corresponding to the second secured value.

In Example T2, the subject matter of Example T1 can optionally include the first secured value corresponds to the second secured value if the first password is equivalent to the second password.

In Example T3, the subject matter of any one of Examples T1-T2 can optionally include the first password is randomly generated for the device and stored in a database.

In Example T4, the subject matter of any one of Examples T1-T3 can optionally include the aggregator is further to receive a request from the unlock host to unlock the device, where the unique identifier is sent to the unlock host in response to receiving the request at the aggregator.

In Example T5, the subject matter of Example T4 can optionally include the aggregator is further to block the request to unlock the device, where the request is blocked based on the first secured value not corresponding to the second secured value.

In Example T6, the subject matter of any one of Examples T1-T5 can optionally include the security function is equivalent to another security function used by a fusing device to compute the first secured value of the first password.

In Example T7, the subject matter of Example T6 can optionally include the security function is Secure Hash Algorithm 3 (SHA-3).

In Example T8, the subject matter of any one of Examples T1-T7 can optionally include that the first password is associated with an unlock mode of a plurality of unlock modes for the device, where the unlock mode specifies the one or more privileged features on the device to be unlocked.

In Example T9, the subject matter of any one of Examples T1-T8 can optionally include a fusing device to: receive the first password and the unique identifier from a database in which the first password and the unique identifier are stored; compute the first secured value of the first password using the security function; and store the first secured value and the unique identifier in the fuse controller of the device.

In Example T10, the subject matter of any one of Examples T1-T9 can optionally include an unlock host to: authenticate one or more credentials of a user; request the unique identifier from the aggregator based, at least in part, on the one or more credentials being authenticated; receive the unique identifier from the aggregator; query a database based on the unique identifier; receive the second password from the database; send the second password to the aggregator; and receive an indication that the one or more privileged features of the device are unlocked based on the aggregator determining the first secured value corresponds to the second secured value.

The following examples pertain to embodiments in accordance with this specification. Example X1 provides an apparatus, a system, one or more machine readable mediums, a method, and/or hardware-, firmware-, and/or software-based logic for unlocking at least a portion of a device, where the Example of X1 includes a security engine in the device to: receive a signed token from an unlock host; store the signed token in a boot partition of the device; subsequent to a boot process initiating, attempt to verify the signed token; send a request to unlock the device based, at least in part, on the attempt to verify the signed token being successful; and an aggregator coupled to the security engine to: receive the request from the security engine to unlock the device; and unlock one or more privileged features on the device based on unlock data in the token.

In Example X2, the subject matter of Example X1 can optionally include that the signed token is based, at least in part, on a device identifier (ID) of the device and a nonce generated by the security engine.

In Example X3, the subject matter of any one of Examples X1-X2 can optionally include that the signed token includes a timestamp and an expiration parameter, wherein the timestamp and the expiration parameter define a time period during which the signed token is valid.

In Example X4, the subject matter of any one of Examples X1-X3 can optionally include that at least one privileged feature is unlocked by disabling code of a computing block on the device.

In Example X5, the subject matter of any one of Examples X1-X4 can optionally include that at least one privileged feature is unlocked by permitting one or more messages associated with a computing block of the device to be outputted.

In Example X6, the subject matter of any one of Examples X1-X5 can optionally include that at least one privileged feature is unlocked by enabling a type of access for a computing block on the device.

In Example X7, the subject matter of Example X6 can optionally include the type of access is selected from a group of access types including debugging, testing, provisioning, prototyping, validating, and analyzing.

In Example X8, the subject matter of any one of Examples X1-X7 can optionally include the security engine is further to: receive, from an unlock host, a request for a device identifier (ID) of the device; generate a nonce; and send the device ID and the nonce to the unlock host.

In Example X9, the subject matter of any one of Examples X1-X8 can optionally include that the attempt to verify the signed token is successful based, at least in part, on verifying integrity of the signed token, and verifying authenticity of the signed token.

In Example X10, the subject matter of Example X9 can optionally include that a token header of the signed token includes a public key associated with a private key used to create a signature of the signed token, where the public key is used to verify the integrity of the signed token and to verify the authenticity of the signed token.

In Example X11, the subject matter of any one of Examples X1-X10 can optionally include that the signed token includes a plurality of device IDs and a plurality of nonces.

In Example X12, the subject matter of Example X11 can optionally include that the attempt to verify the token is successful based, at least in part, on determining a device ID stored in the device corresponds to one of the plurality of device IDs in the signed token, and determining a nonce stored in the device corresponds to one of the plurality of nonces associated with the one of the plurality of device IDs.

In Example Y1 provides an apparatus for unlocking at least a portion of a device, where the apparatus comprises means for performing the method of any one of the preceding Examples.

In Example Y2, the subject matter of Example Y1 can optionally include that the means for performing the method comprises at least one processor and at least one memory element.

In Example Y3, the subject matter of Example Y2 can optionally include that the at least one memory element comprises machine readable instructions that when executed, cause the apparatus to perform the method of any one of the preceding Examples.

In Example Y4, the subject matter of any one of Examples Y1-Y3 can optionally include that the apparatus is one of a computing system, a processing element, or a system-on-a-chip.

Example Y5 provides at least one machine readable storage medium comprising instructions for unlocking at least a portion of a device, where the instructions when executed realize an apparatus or implement a method as in any one of the preceding Examples.

Example Z1 provides an apparatus, a system, one or more machine readable mediums, a method, and/or hardware-, firmware-, and/or software-based logic for unlocking at least a portion of a device, where the Example of Z1 comprises a fuse controller including circuitry for storing, in a plurality of fuses, a unique identifier of the device and a first secured value of a first password associated with the unique identifier, an aggregator comprising circuitry and coupled to the fuse controller, and a security engine comprising circuitry and coupled to the aggregator. The aggregator is to receive the unique identifier and the first secured value from the fuse controller, send the unique identifier to an unlock host, and receive an error message from the unlock host indicating a second password was not retrieved. The security engine is to retrieve a signed token from a boot partition of the device, attempt to verify the signed token, and send a request to unlock the device based, at least in part, on the attempt to verify the signed token being successful. The aggregator is further to receive the request from the security engine to unlock the device, and unlock one or more privileged features on the device based on unlock data in the token.

What is claimed is:

1. An apparatus, comprising:
   a security engine to:
   receive, from an unlock host, a first request for a device identifier (ID);
   generate a nonce;
   prior to a boot process initiating, send the device ID and the nonce to the unlock host;
   receive a signed token from the unlock host, the signed token to include unlock data that indicates one or more privileged features to be unlocked;
   subsequent to the boot process initiating, verify the signed token received from the unlock host; and send a second request to unlock the one or more privileged features based, at least in part, on the signed token being verified; and an aggregator coupled to the security engine to:
receive the second request from the security engine to unlock the one or more privileged features; and
unlock the one or more privileged features based on the unlock data in the verified signed token.

2. The apparatus of claim 1, wherein the signed token is generated based, at least in part, on information included in the signed token, the information to include the device ID and the nonce generated by the security engine.

3. The apparatus of claim 1, wherein the signed token includes a timestamp and an expiration parameter, wherein the timestamp and the expiration parameter define a time period during which the signed token is valid.

4. The apparatus of claim 1, wherein at least one privileged feature is unlocked by disabling code of a computing block.

5. The apparatus of claim 1, wherein at least one privileged feature is unlocked by permitting one or more messages associated with a computing block to be outputted.

6. The apparatus of claim 1, wherein at least one privileged feature is unlocked by enabling a type of access for a computing block.

7. The apparatus of claim 6, wherein the type of access is selected from a group of access types including debugging, testing, provisioning, prototyping, validating, and analyzing.

8. The apparatus of claim 1, wherein the security engine is further configured to:
store the signed token in a boot partition of the apparatus.

9. The apparatus of claim 1, wherein the signed token is to be verified based, at least in part, on:
verifying integrity of the signed token; and
verifying authenticity of the signed token.

10. The apparatus of claim 9, wherein a token header of the signed token includes a public key associated with a private key used to create a signature of the signed token, wherein the public key is used to verify the integrity of the signed token and to verify the authenticity of the signed token.

11. The apparatus of claim 1, wherein the signed token includes a plurality of device identifiers and a plurality of nonces.

12. The apparatus of claim 11, wherein the signed token is to be verified based, at least in part, on:
determining that the device ID stored in a memory of the apparatus corresponds to one of the plurality of device IDs in the signed token; and
determining that the nonce stored in the memory of the apparatus corresponds to one of the plurality of nonces associated with the one of the plurality of device IDs.

13. The apparatus of claim 1, wherein the signed token is stored in a firmware image to be used by a boot partition for the boot process.

14. The apparatus of claim 1, wherein a token header of the signed token includes a public key, wherein the public key is based on a Root of Trust (RoT) key manifest or a key manifest rooted with the public key in fuses of the apparatus.

15. At least one non-transitory machine readable medium having instructions stored thereon, the instructions when executed by at least one processor cause the at least one processor to:
receive, at a security engine from an unlock host, a first request for a device identifier (ID);
generate, by the security engine, a nonce;
prior to a boot process initiating, send the device ID and the nonce to the unlock host;
receive, at the security engine, a signed token from the unlock host, the signed token to include unlock data that indicates one or more privileged features to be unlocked;
subsequent to the boot process initiating, verify the signed token received from the unlock host;
send a second request to an aggregator coupled to the security engine to unlock the one or more privileged features based, at least in part, on the signed token being verified; and
in response to receiving the second request to unlock the one or more privileged features, unlock the one or more privileged features based on the unlock data in the verified signed token.

16. The at least one non-transitory machine readable medium of claim 15, wherein the signed token is generated based, at least in part, on information included in the signed token, the information to include the device ID and the nonce generated by the security engine.

17. The at least one non-transitory machine readable medium of claim 15, wherein the signed token includes a timestamp and an expiration parameter, wherein the timestamp and the expiration parameter define a time period during which the signed token is valid.

18. The at least one non-transitory machine readable medium of claim 15, wherein at least one privileged feature associated with a computing block is unlocked by at least one of:
disabling code of the computing block;
permitting one or more messages associated with the computing block to be outputted; and
enabling a type of access for the computing block.

19. The at least one non-transitory machine readable medium of claim 15, wherein the instructions when executed by the at least one processor cause the at least one processor to:
store the signed token in a boot partition.

20. The at least one non-transitory machine readable medium of claim 15, wherein the signed token is stored in a firmware image to be used by a boot partition for the boot process.

21. The at least one non-transitory machine readable medium of claim 15, wherein the instructions when executed by the at least one processor cause the at least one processor to store the signed token in a boot partition by one of:
firmware, the firmware to generate the device ID; or
a host process, the host process to communicate with the firmware to obtain the device ID and to request that the signed token be stored in the boot partition.

22. A system, comprising:
a processor;
a security engine to:
receive, from an unlock host, a first request for a device identifier (ID);
generate a nonce;
prior to a boot process initiating, send the device ID and the nonce to the unlock host;
receive a signed token from the unlock host, the signed token to include unlock data that indicates one or more privileged features to be unlocked;
subsequent to the boot process initiating, verify the signed token received from the unlock host; and send a second request to unlock the one or more privileged features based, at least in part, on the signed token being verified; and an aggregator coupled to the security engine to:
receive the second request from the security engine to unlock the one or more privileged features; and
unlock the one or more privileged features based on the unlock data in the verified signed token.

23. The system of claim 22, further comprising:
a boot partition to store the signed token received from the unlock host.

* * * * *